US012578846B2

(12) United States Patent
Price et al.

(10) Patent No.: US 12,578,846 B2
(45) Date of Patent: Mar. 17, 2026

(54) GENERATING MASKED REGIONS OF AN IMAGE USING A PREDICTED USER INTENT

(71) Applicant: Adobe Inc., San Jose, CA (US)

(72) Inventors: Brian Price, Pleasant Grove, UT (US); Yifei Fan, Santa Clara, CA (US); Joshua Myers-Dean, Boulder, CO (US)

(73) Assignee: Adobe Inc., San Jose, CA (US)

( * ) Notice: Subject to any disclaimer, the term of this patent is extended or adjusted under 35 U.S.C. 154(b) by 112 days.

(21) Appl. No.: 18/066,199

(22) Filed: Dec. 14, 2022

(65) Prior Publication Data

US 2024/0201832 A1 Jun. 20, 2024

(51) Int. Cl.
| | |
|---|---|
| *G06F 3/04845* | (2022.01) |
| *G06T 5/77* | (2024.01) |
| *G06T 9/00* | (2006.01) |
| *G06V 10/25* | (2022.01) |
| *G06V 10/764* | (2022.01) |
| *G06V 10/771* | (2022.01) |

(52) U.S. Cl.
CPC ............ *G06F 3/04845* (2013.01); *G06T 5/77* (2024.01); *G06T 9/00* (2013.01); *G06V 10/25* (2022.01); *G06V 10/764* (2022.01); *G06V 10/771* (2022.01); *G06T 2207/20104* (2013.01)

(58) Field of Classification Search
CPC .. G06F 3/04845; G06V 10/25; G06V 10/771; G06V 10/764; G06T 5/77; G06T 9/00; G06T 2207/20104
USPC ........................................................ 345/619
See application file for complete search history.

(56) References Cited

U.S. PATENT DOCUMENTS

| | | | | |
|---|---|---|---|---|
| 2019/0228508 A1* | 7/2019 | Price | | G06T 5/70 |
| 2021/0304449 A1* | 9/2021 | Mourkogiannis | ....... | G06T 11/60 |
| 2023/0118361 A1* | 4/2023 | Liba | | G06T 3/40 |

OTHER PUBLICATIONS

Sofiiuk, K., et al., "Reviving Iterative Training with Mask Guidance for Interactive Segmentation", arXiv:2102.06583v1, Feb. 12, 2021, pp. 1-15.
Yang, S. D. H., et al., "Unified Interactive Image Matting", arXiv:2205. 08324v2, May 23, 2022, pp. 1-12.
Senzer et al., "Photobombs begone with Magic Eraser in Google Photos", Oct. 19, 2021, 4 pages.

* cited by examiner

*Primary Examiner* — Hai Tao Sun
(74) *Attorney, Agent, or Firm* — Nicholson De Vos Webster & Elliott LLP

(57) ABSTRACT

Embodiments are disclosed for predicting a user's intent to generate a masked region of an image based on a user gesture. The method may include receiving a user interaction corresponding to a region in an image. The user interaction is used to select the object in the image. The method further includes generating a feature map using a first machine learning model and the user interaction, where the feature map includes at least one feature corresponding to a mode type. The mode type is an intended operation of a user. Lastly, the method includes generating a mask of the object in the image using a second machine learning model, wherein the mask is generated responsive to the mode type.

20 Claims, 11 Drawing Sheets

1000

RECEIVING A USER INTERACTION CORRESPONDING TO A REGION IN AN IMAGE
1002

GENERATING A FEATURE MAP USING A FIRST MACHINE LEARNING MODEL AND THE USER INTERACTION, WHEREIN THE FEATURE MAP INCLUDES A FEATURE CORRESPONDING TO A MODE TYPE
1004

GENERATING A MASK OF THE REGION IN THE IMAGE USING A SECOND MACHINE LEARNING MODEL, WHEREIN THE MASK IS GENERATED RESPONSIVE TO THE MODE TYPE
1006

1000

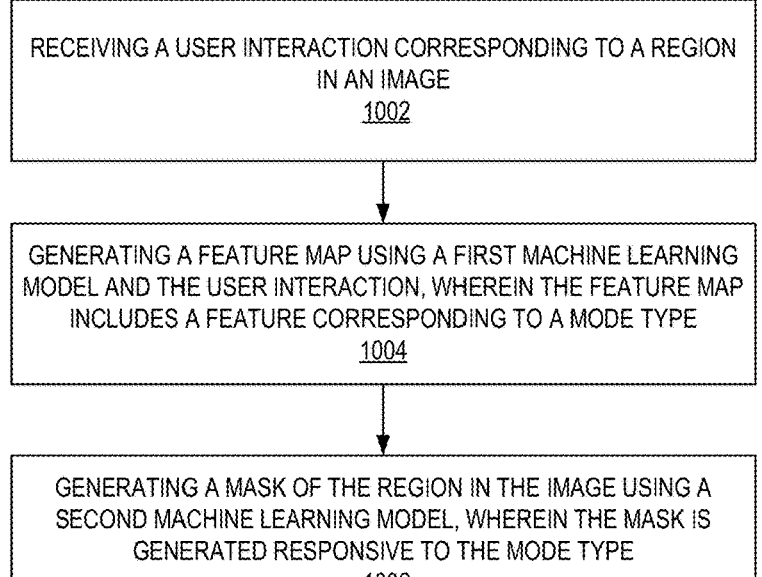

RECEIVING A USER INTERACTION CORRESPONDING TO A REGION IN AN IMAGE
1002

GENERATING A FEATURE MAP USING A FIRST MACHINE LEARNING MODEL AND THE USER INTERACTION, WHEREIN THE FEATURE MAP INCLUDES A FEATURE CORRESPONDING TO A MODE TYPE
1004

GENERATING A MASK OF THE REGION IN THE IMAGE USING A SECOND MACHINE LEARNING MODEL, WHEREIN THE MASK IS GENERATED RESPONSIVE TO THE MODE TYPE
1006

*FIG. 10*

GENERATING MASKED REGIONS OF AN IMAGE USING A PREDICTED USER INTENT

BACKGROUND

Digital tools allow artists to interact with objects (and sub-objects) in an image. To indicate an object to be interacted with, users use one of multiple tools to select an object of interest. The tool selected and used by the user to indicate the object of interest is based on the user's accuracy indicating the object of interest, the user's gesture to indicate the object of interest, and the like. For example, a user may select one tool of multiple tools based on the gesture the user intends to perform (selecting, lassoing, tracing, boxing, stroking, etc.). Tools are used improperly when the user uses the wrong gesture with the wrong tool. For example, a user may use a bounding box tool but indicate the object of interest using a lasso. Because the bounding box tool does not expect a lasso gesture, the tool fails to correctly capture the object of interest. When the appropriate tool is used with the appropriate gesture (e.g., a selection tool receives a user selection of an object of interest), the object of interest is captured. After the object of interest is captured, the user may user may adjust attributes of the object (e.g., size, color, shape, opacity, position), add similar objects, delete the object, and the like.

SUMMARY

Introduced here are techniques/technologies that automatically predict a user intent to generate a mask based on a user gesture. A segmentation system predicts the user intent such that the user does not have to specify their intent (e.g., interacting with a button in a digital workspace, selecting a specific tool). Moreover, the system recognizes multiple gestures (e.g., universal gestures) such that a user does not have to use a particular gesture to indicate the user's intent.

Present embodiments generate a mask using a reduced number of user inputs to improve a user experience. The mask indicates a captured group of pixels or other region of an image. As described herein, a group of pixels in an image includes an object. The object includes the whole object or parts of the object such as sub-objects. The segmentation system may leverage classifiers to predict a mode type and a gesture type. Using the predicted mode type and gesture type, the segmentation system employs a machine learning model to generate the mask, representing a region of interest in an image. The generated mask is based on adding groups of pixels such that an initial mask is created. Additionally or alternatively, the generated mask is based on adding/removing groups of pixels from an initial mask. In this manner, the segmentation system iteratively corrects an initial mask.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 10 illustrates a flowchart of a series of acts in a method of predicting a user's intent to generate a mask based on a user gesture, in accordance with one or more embodiments.

DETAILED DESCRIPTION

Figure 1:
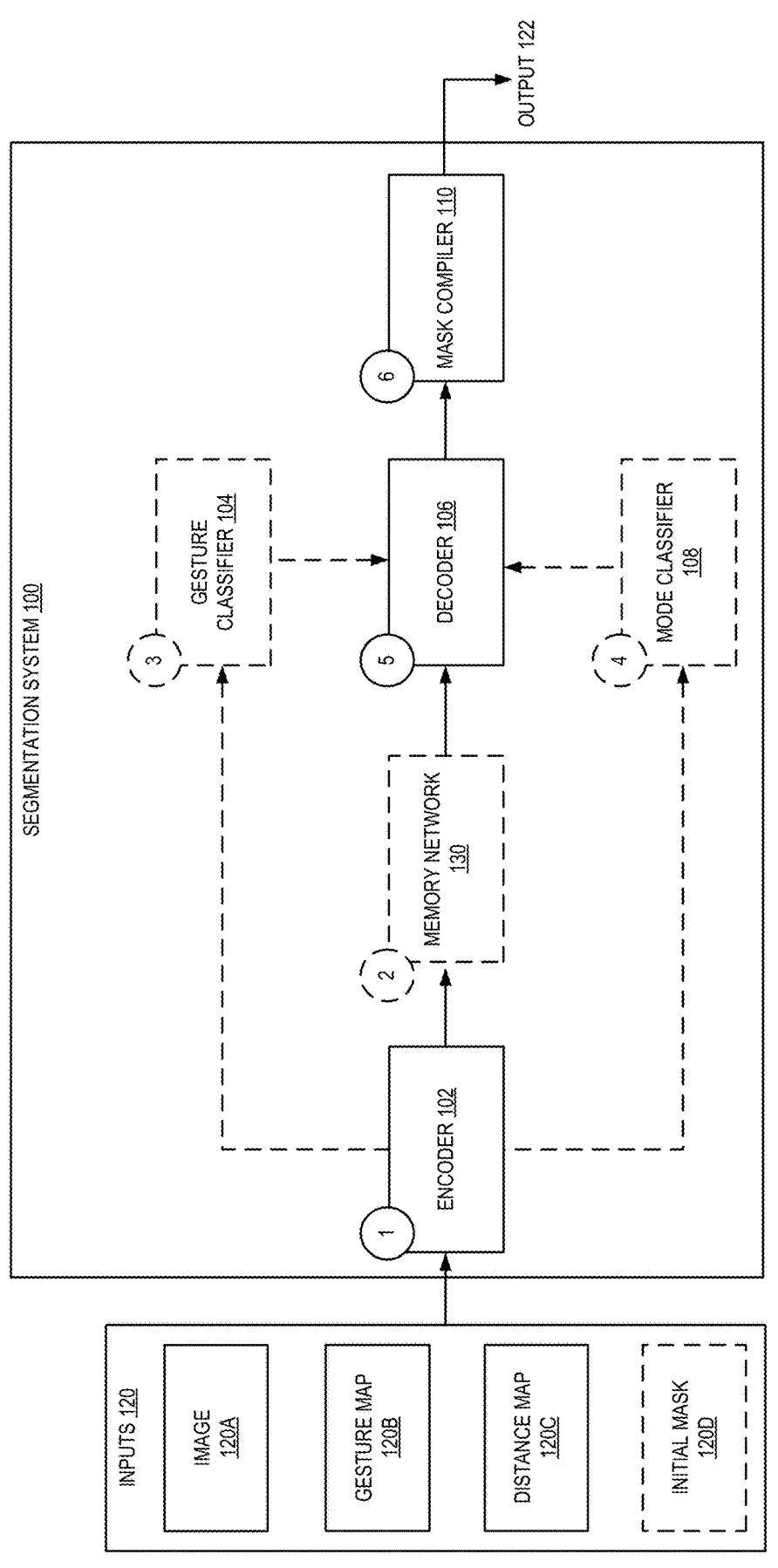
FIG. 1 illustrates a diagram of a process of predicting a user's intent, in accordance with one or more embodiments.

One or more embodiments of the present disclosure include a segmentation system that interprets user gestures to capture a region (or group of pixels) in an image and/or add/subtract the group of pixels from an existing selection. One conventional approach involves gesturing with specific tools. For example, a first tool interprets stroking gestures, a second tool interprets lasso gestures, and a third tool interprets a user selection (e.g., a click). Each of the tools have different strengths and weaknesses and can be executed depending on an object in the image to be selected (e.g., the scale of the object, the granularity of the object selection), the digital scene (e.g., the scale of the object as part of the digital scene), and the like. However, the user must perform the appropriate gesture when using the selected tool. Moreover, different tools accept different degrees of precision. For example, some tools require accuracy when identifying an object of interest in the image. Alternatively, other tools accept loose boundaries when identifying an object of interest in the image. Performing a gesture different from the gesture expected by the tool leads to undesired results. Moreover, performing an incorrect degree of accuracy associated with the specific tool leads to undesired results.

Another conventional approach involves accepting multiple gestures to delete an object (or sub-object) from an image. However, the user's intent is limited in such an approach. That is, the user is limited to deleting objects from an image and instead may not adjust attributes of the captured object, copy the captured object, and/or add to the captured object.

Yet other conventional approaches involve adding or deleting objects (or sub-objects) from previously selected objects (or sub-objects) using an explicit indication that the tool is to add or delete objects from the previously selected object. For example, a user may enter a key to enable "add mode" or "subtract mode." Additionally or alternatively, a user may interact with a digital interface. For example, a user may select a button that enables "add mode" or "subtract mode." In these approaches, the user's intent is not predicted as the user must explicitly indicate the user's intent.

To address these and other deficiencies in conventional systems, the segmentation system of the present disclosure interprets universal user gestures and predicts a user intent to generate a mask. For example, using the segmentation system, a user may interact with a region in an image (e.g., an object of interest) by clicking on pixel(s) associated with the object. In one example, the object of interest may be a flower. When the user clicks on the object, the segmentation system interprets the click and captures the flower.

In one implementation, the segmentation system may not capture all of the flower. For example, the segmentation system may not capture the stem of the flower. As a result, the user may draw a bounding box around the stem of the flower. The segmentation system accepts the gesture (e.g., the bounding box, in addition to the selection of the flower). Moreover, the segmentation system interprets the user's intent to add the stem to the previously selected flower.

In another example, the segmentation system may capture something that is not part of the flower. For instance, the segmentation system may capture a human arm as a petal of the flower. The segmentation system may capture the human arm as the petal of the flower because the human arm is in close proximity to the flower, the human arm is the same shade as the petal of the flower, and the like. As a result, the user may lasso the human arm. Again, the segmentation system accepts the gesture (e.g., the lasso, in addition to the bounding box and the selection). The segmentation system interprets the human arm to be a sub-object removed from the previously captured flower object.

Using the segmentation system to classify what gesture the user is preforming to capture a region in an image, and to classify what the user intent is with the captured region, results in less time a user spends manifesting a user's creative intent, and more time seamlessly creating art. By predicting the user's intent, the segmentation system reduces the number of steps performed by the user. For example, the user does not have to perform a specific gesture for a specific tool. Moreover, a user does not have to indicate the user's intent. In this manner, the user is able to select pixel(s) corresponding to regions (e.g., objects and/or sub-objects) in an image to be edited, without regard to how the selection is being performed and whether the right tool in the digital workspace is being utilized. Such user intent predictions also result in reduced computing resources such as power, memory, and bandwidth, that a user would otherwise spend making multiple selections, responsive to a tool improperly being utilized. For example, computing resources are not wasted by multiple user attempts to manifest the user's creative intent. Instead, a user naturally interacts with regions of an image and the segmentation system predicts the user's intent. Accordingly, computing resources such as power, memory, and bandwidth are preserved as the time spent controlling various tools is reduced. For ease of description, the present disclosure describes objects and/or subobjects. However, it should be appreciated that the segmentation system is capable of capturing (and masking) a region in an image. That is, generally, the segmentation system captures one or more pixels corresponding to regions of an image, where the region is a portion of an object (including the whole object).

FIG. 1 illustrates a diagram of a process of predicting a user's intent, in accordance with one or more embodiments. As shown in FIG. 1, embodiments include a segmentation system 100. The segmentation system 100 includes an encoder 102, a gesture classifier 104, a decoder 106, a mode classifier 108, a mask compiler 110, and in some implementations, a memory network 130. For ease of description, the present disclosure describes the segmentation system 100 in terms of being applied to an object in an image, but it should be appreciated that the segmentation system 100 can be applied to sub-objects in the image. That is, an object of interest is a sub-object and the segmentation system 100 is used to capture the sub-object (e.g., mask the sub-object in the image).

At numeral 1, the segmentation system 100 receives an input 120. The input 120 is a concatenation of one or more of inputs 120A-120D. Input 120A is an image, which may be a computer-generated image, a frame of a video, a picture captured by a camera (or other sensor), a bitmap, and the like.

Inputs 120B and 120C are used to interpret a user gesture. In some embodiments, both inputs 120B and 120C are included as part of input 120. In other embodiments, either input 120B or input 120C are included as part of input 120. Input 120B is a gesture map indicating the gesture performed by the user. For example, one or more pixels associated with the user gesture are indicated using the gesture map 120B.

Gestures performed by the user may include clicking or tapping any region of an object of interest. Other gestures performed by the user include the user drawing a loose circle around the object of interest (referred to herein as lassoing an object). Yet other gestures include tracing around the object of interest. The trace around the object may be a fine trace (e.g., an accurate trace around the object), a loose trace (e.g., similar to a lassoed object), or some degree of accuracy in between a loose tracing and a lasso. Another gesture performed by the user may include drawing a box around the object of interest. For example, the user may interact with a first position (e.g., clicking a first position, tapping a first position, etc.) and drag a box to a second position around the object. The dragged box may closely bound the object (e.g., the edge of the object is close to the boundary of the box). The dragged box may also loosely bind the object (e.g., the edge of the object is not close to the boundary of the box). A user may also paint and/or stroke the object of interest. The strokes of the object may be inaccurate scribbles on top of the object. Alternatively, the strokes of the object may paint the object.

In some embodiments, input 120B is an aggregation of gestures. For example, input 120B may include an accumulation of a predetermined number of gestures. In this manner, the aggregation of gestures is provided as input 120B instead of simply a most recent gesture performed by the user. In some embodiments, the aggregation of gestures is accumulated over a number of iterations. For example, a user clicks on a first sub-object in an image (a first iteration) and receives an image including a masked first sub-object (e.g., the operations of the segmentation system 100 as described herein are executed). Subsequently, the user clicks on a second sub-object in the image (a second iteration). The input 120B to the segmentation system 100 at the second iteration may include both the first sub-object and the second sub-object. Additionally or alternatively, the aggregation of gestures is accumulated over a time period. For example, a user performs a first stroke gesture at a first time period and subsequently performs a second stroke gesture at a second time period. The input 120B may include both the first stroke and the second stroke if the second time period is within threshold period of time from the first time period (e.g., 1 second). In some embodiments, one or more upstream processes is configured to aggregate the gestures of input 120B. In other embodiments, the segmentation system 100 aggregates the gestures of input 120B based on the received user inputs over a period of time, a period of iterations, and the like. For example, an input preprocessor (not shown) can aggregate the gestures of input 120B.

Input 120C is a distance map. In some embodiments, the distance map is based on the image (e.g., input 120A) and the gesture map (e.g., input 120B). For example, the distance map (e.g., input 120C), based on the image and the gesture map, indicates at each pixel in the image, the distance from that pixel to a nearest gesture point. In other words, the distance map indicates a distance from each pixel to the pixel(s) associated with the user performed gesture. In some embodiments, the distance map indicates the distance up to a maximum (e.g., 255 pixels). The distance may be represented using Euclidean distance, where each pixel tells indicates an exact distance away from a gesture point, a Gaussian distance, where a Gaussian curve is fit to the gesture point, and the like. In some embodiments, one or more upstream processes is configured to generate the distance map based on the image and the gesture map. In other embodiments, the segmentation system 100 generates the distance map from the image and the gesture map. For example, an input preprocessor (not shown) can generate the distance map based on the distance of one or more gesture points of the gesture map and the image (e.g., a size of the image). The generated distance map is part of inputs 120.

Input 120D is an initial mask. The initial mask is a mask of a previously captured object (e.g., a previously selected object). In some embodiments, input 120D is not included in input 120. For example, a user has not previously captured an object. As described herein, the segmentation system 100 is configured to iteratively correct (or refine) previously captured objects (e.g., an object captured in a previous iteration).

In some embodiments, a third-party tool (or other upstream process) generates the initial mask. In other embodiments, the segmentation system 100 generates the initial mask. For example, a user selects an object of interest at a first iteration. The processes described herein are executed to determine a mask of the selected object of interest. Subsequently, at a next iteration, the user selects an additional object of interest. The processes described herein are executed to determine a mask of the additional object of interest using the previously determined mask of the selected object as input 120D.

In some embodiments, the initial mask is not an accurate mask of an object of interest. For example, the initial mask may mask sub-objects that are not a part of the object of interest. Additionally or alternatively, the initial mask may be missing sub-objects that are part of the object of interest. The initial mask 120D is received by the segmentation system 100 such that the segmentation system 100 improves the accuracy of the initial mask.

Input 120 may also include user preference information. For example, a user may indicate the user intent of "adding" or "removing" an object from a previously selected object. In this manner, a user may indicate an "add mode" or "remove mode." Additionally or alternatively, the user may indicate a gesture preference. For example, the user may indicate that they will perform lasso gestures. Such user inputs may be received by segmentation system 100 using buttons, check-boxes, drop down menus, and the like, all displayed on a user interface.

At numeral 1, an encoder 102 of the segmentation system 100 receives input 120. The encoder 102 determines a latent space representation of inputs 120, which is a numerical representation of inputs 120. For example, the numerical representation of inputs 120 may be a feature map (otherwise referred to herein as a feature vector) of extracted properties/characteristics of inputs 120. In some embodiments, the encoder 102 is a Pyramid Vision Transformer (PVT), however other suitable encoders such as a differential convolutional neural network and/or a transformer network can be used as encoder 102.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the segmentation system 100 are discussed below with respect to FIGS. 7 and 8.

In some embodiments, at numeral 2, the feature map (otherwise referred to herein as a feature vector) determined by the encoder 102 is input to any network with memory (e.g., memory network 130). Memory network 130 is a network that can pass a state of the network from a first step (e.g., when a user makes a first interaction) to a next step (e.g., when the user makes a second interaction).

By passing the state of the network from a first step to a second step, the memory network 130 is used to prevent stall patterns. A stall pattern is a pattern in which the same object (or sub-object) is removed and added to a mask in subsequent iterations. For example, a user may perform a gesture (e.g., lasso) to indicate the user's intent to select (or otherwise capture) a giraffe in an image including a giraffe and a tree. This first gesture is considered a first step in iteratively capturing an object of interest (e.g., selecting the giraffe in the image). The processes described herein results in a masked giraffe and a masked tree branch. That is, the segmentation system 100 inadvertently captured the tree as part of the giraffe. In a second step in the iterative process, the user performs a gesture (e.g., a click) to indicate the user's intent to remove the masked tree branch from the masked giraffe. In the second example, the processes described herein may result in the removal of the tree branch in addition to a masked giraffe missing a head. For instance, the segmentation system removes the giraffe head and the tree branch because the tree branch is in close proximity to the giraffe head. In a third step in the iterative process, the user performs a gesture (e.g., a bounding box) to indicate the user's intent to add the giraffe head to the masked giraffe. The processes described herein may result in a masked giraffe including the tree branch.

As described, the stall pattern is a pattern in which the same object (or sub-object) is removed and added to the mask. For example, when the user intends to add the giraffe head, the tree branch is also added. Further, when the user intends to remove the tree branch, the giraffe head is also removed. To prevent such a stall pattern, the segmentation system 100 may include one or more memory components (e.g., memory network 130) to "remember" previous user interactions. In operation, the segmentation system uses state information to prevent stall patterns associated with adding/removing pixels of a mask.

It should be appreciated that memory network 130 may be inserted in any one or more places of the segmentation system 100. In some embodiments, a long-short term memory (LSTM) network is deployed. The LSTM network learns dependencies of data in a sequence. The sequence, in this case, is a sequence of user gestures (data) to capture an object of interest in an image. Each step of a sequence, the LTSM network computes a hidden state that the LSTM network iteratively fine tunes to learn the dependences of the data in the sequence. Each hidden state is an improved hidden state based on the previously determined hidden states. In this manner, the LSTM network is able "remember" state information of previous steps in the sequence.

At numeral 3, a gesture classifier 104 classifies a user gesture as one of a click (or tap), stroke (e.g., drawing, including one line strokes and back and forth scribbles), lasso (including loose lassos around the object of interest and finely traced lassos), bounding box, and the like. Each gesture is a class whose probability is predicted by the gesture classifier 104 using the feature map extracted by the encoder 102. The class with the highest probability is the classified gesture type of the user gesture. The gesture classifier 104 may be any classifier including a multi layer perceptron.

In some embodiments, the predicted gesture type is fed as an input to the decoder 106. Providing the gesture type to the decoder 106 allows the decoder 106 to benefit from any dependencies between a gesture type and a probability of a pixel belonging to an object of interest (captured as part of inputs 120). Additionally or alternatively, the predicted gesture type is part of output 122. For example, output 122 can include an indication of the user gesture received by the segmentation system 100 (e.g., as part of inputs 120 and specifically input 120B and/or input 120C).

At numeral 4, a mode classifier 108 classifies the mode type corresponding to the user gesture. A mode is an intended operation of a user. For example, a user may add an object to a previously selected object (e.g., add a sub-object that was not originally captured in the object of interest). Accordingly, the mode type is an "add mode." The user may also subtract an object from a previously selected object (e.g., remove a sub-object that was originally captured but that is not part of the object). Accordingly, the mode type is a "remove mode" (or a "subtract mode"). Each mode is a class whose probability is predicted by the mode classifier 108 using the feature map extracted by the encoder 102. The class with the highest probability is the mode classification type associated with the intended operation of the user. The mode classifier 108 may be any classifier including a multi layer perceptron.

In effect, the mode classifier 108 classifies a user intent as "add" by predicting whether the gesture was a foreground gesture adding something to a mask or if there is no mask, then creating a mask. In the event there is not a previously selected object, the mode classifier 108 classifies the user intent as "add." Alternatively, the mode classifier 108 classifiers the user intent as "remove" by predicting whether the gestures was a background gesture to remove something from the mask.

In some embodiments, the predicted mode is fed as an input to the decoder 106 such that the decoder 106 generates a mask of an object of interest responsive to "add mode" or "subtract mode." As described herein, in "add mode" the decoder 106 adds pixels to a mask of an object of interest. In contrast, in "remove mode" the decoder 106 removes pixels from the mask of the object of interest. Additionally or alternatively, the predicted mode type is output as part of output 122.

While the segmentation system 100 shows both the gesture classifier 104 and the mode classifier 108, in some implementations, the segmentation system 100 does not include the gesture classifier 104 and/or the mode classifier 108. In this implementation, the feature map/feature vector determined from the encoder 102 (and/or the memory network 130) is provided as an input to the decoder 106. In some embodiments, the feature map determined by the encoder 102 may include the mode type and/or the gesture type. Specifically, one or more features determined by the encoder 102 correspond to a mode type, and one or more features determined by the encoder 102 correspond to a gesture type. In these embodiments, the encoder 102 may be trained to determine the gesture type in a similar fashion to how the gesture classifier 104 determines the gesture type. That is, the encoder 102 is trained to perform the gesture classification task using the same training inputs-outputs as discussed with reference to training the gesture classifier 104. Training the gesture classifier 104 is described in more detail with reference to FIGS. 7-8. Similarly, the encoder 102 may be trained to determine the mode type in a similar fashion to how the mode classifier 108 determines the mode type. That is, the encoder 102 is trained to perform the mode classification task using the same training inputs-outputs as discussed with reference to training the mode classifier 108. Training the mode classifier 108 is described in more detail with reference to FIGS. 7-8.

At numeral 5, the decoder 106 generates a mask of the object of interest using the feature map extracted by the encoder 102, the mode classification determined by the mode classifier 108, and/or the gesture classification determined by the gesture classifier 104. In implementations where the segmentation system 100 includes the memory network 130, the decoder 106 generates the mask of the object using a feature map extracted by the memory network 130 (and some combination of the mode type determined by the mode classifier 108 and/or the gesture type determined by the gesture classifier 104).

The mask is a probability of each pixel belonging to the object of interest. As a result of generating the mask, an object of the image is captured or otherwise distinguished from other objects of the image. For example, the mask may highlight the object in the image. In operation, the mask generated by the decoder 106 indicates foreground objects and background objects. Background objects may be represented by pixels set to a first value (e.g., pixels set to "0" representing black) and foreground objects are represented by pixels set to a second value (e.g., pixels set to "1" representing white).

In "add mode" the decoder 106 "adds" pixels to the generated mask of the object of interest. As described herein, if there is not a previously captured object of interest (e.g., no input 120D), then the decoder 106 "adds" pixels to generate the mask of the object of interest. If there is a previously captured object of interest (indicated by input 120D, a previously selected object mask), then the decoder 106 "adds" pixels of the captured object to the initial mask. In this manner, the initial mask is corrected (or otherwise revised) to include the additional pixels of the captured object.

In "remove mode", the decoder 106 "removes" pixels from a previously captured object of interest (e.g., the initial mask, indicated by input 120D) of the captured object of interest. In this manner, the initial mask is corrected (or otherwise revised) to remove pixels of the captured object.

In some implementations, the decoder 106 is a single decoder module, which may be any suitable decoder configured to perform dense prediction tasks (such as pixel level predictions). For example, the decoder 106 may be a feature pyramid network (FPN). In some implementations of the single decoder module, the decoder 106 generates a mask responsive to the classified mode type. In other implementations of the single decoder module, the decoder 106 is configured to generate both a mask in "remove mode" and a mask in "add mode." In these embodiments, the decoder 106 generates two masks, and the mask compiler 110 may select a mask to compile and output as output 122. The mask compiler 110 selects a mask to compile according to the output from the mode classifier 108. For example, if the mode classifier 108 determines that the mode type is the "add mode" based on the likelihood of the "add mode" class being higher than the "remove mode" class, then the "add mode" mask is selected by the mask compiler 110. In contrast, if the mode classifier 108 determines that the mode type is the "remove mode" based on the likelihood of the "remove mode" class being higher than the "add more" class, then the "removal mask" is selected by the mask compiler 110. In other embodiments, the mask compiler 110 selects a mask to compile based on a user input. For example, as part of user input 120, a user may indicate "add mode" or "remove mode." Accordingly, the mask compiler 110 selects the mask according to the mode indicated by the user. In other implementations, the decoder 106 is a decoder network. The decoder network includes one or more decoders and is described with reference to FIGS. 5 and 6.

At numeral 6, the mask compiler 110 converts the mask generated from the decoder 106 to a mask understandable by humans. For example, the mask compiler 110 receives the probabilities of each pixel belonging to the mask and converts the mask generated from the decoder 106 to a mask displayed to the user. Specifically, the mask compiler 110 displays the mask to the user by overlaying the masked object (or sub-object) with one or more visual indicators. Such overlayed visual indicators may be colors, patterns, and the like, displayed to the user.

Additionally or alternatively, the mask compiler 110 receives binary values of each pixel. For instance, pixels set to a value of "0" are not included in the mask while pixels set to a value of "1" are included in the mask. Subsequently, the mask compiler 110 transforms the pixel values into colors to be displayed to a user. For example, pixels set to "1" are painted a particular color (and may include a particular translucence, brightness, opacity, etc.). In contrast, pixels set to "0" are painted a particular color (e.g., black) and/or are mapped to the initial color of the pixel in the input image (e.g., input 120A). In this manner, the mask compiler 110 provides an output image (e.g., output 122) including a masked object, where the masked object includes pixels of a particular color and non-masked objects retain their original color as provided in the input image. In other embodiments, the output 122 is communicated to one or more devices for subsequent processing.

Figure 2:
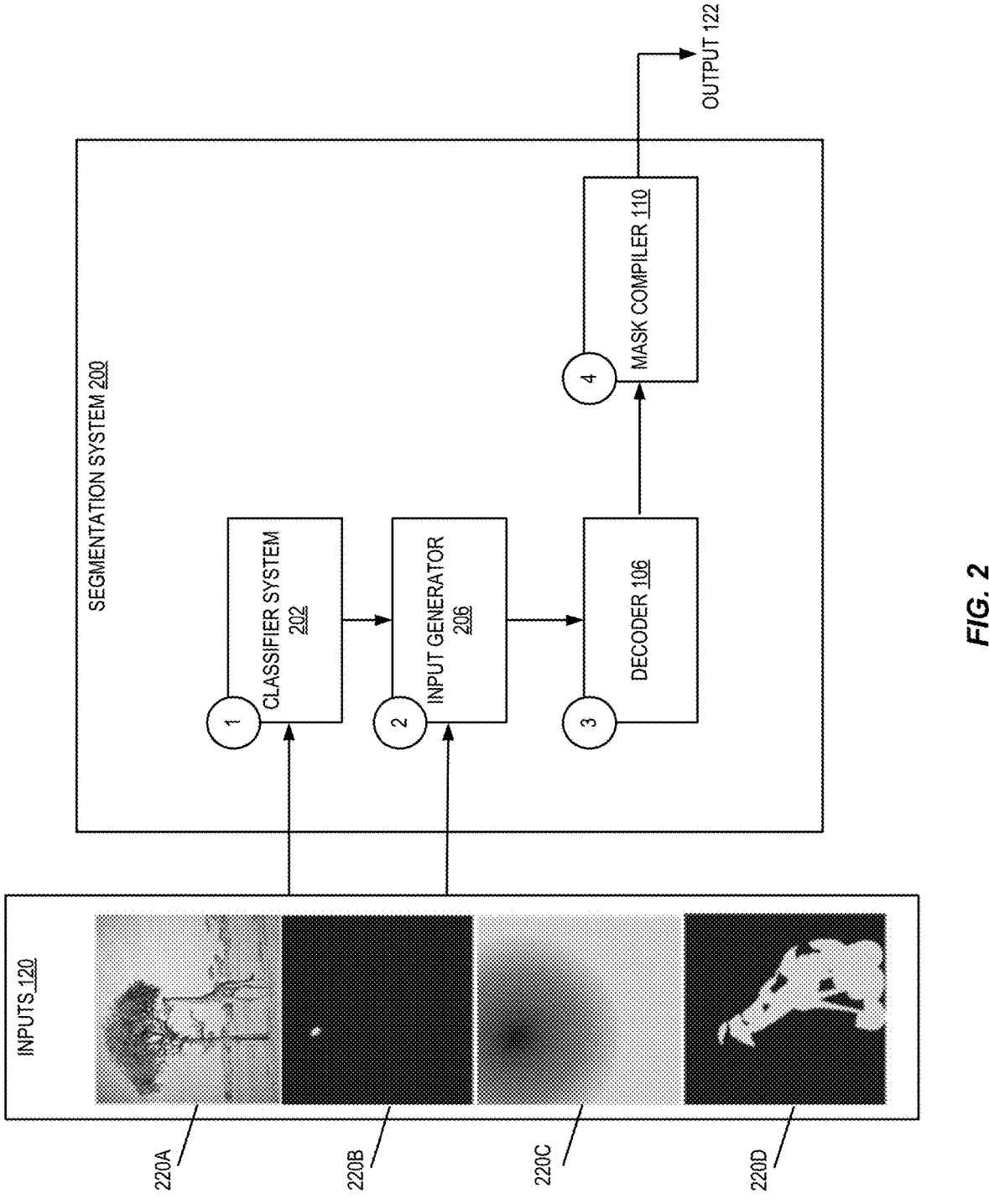
FIG. 2 illustrates an alternate diagram of a process of predicting a user's intent, in accordance with one or more embodiments.

FIG. 2 illustrates an alternate diagram of a process of predicting a user's intent, in accordance with one or more embodiments. Segmentation system 200 is an example of the segmentation system 100 executing a classifier system 202 and a decoder system 204, which are described in more detail in FIGS. 3-6. As illustrated in FIG. 2, the segmentation system 200 receives inputs 120, which includes one or more of inputs 120A-120D.

Specifically, image input 120A is illustrated as RGB image 220A. Gesture map 120B is illustrated as gesture map 220B. As shown, the gesture map 220B illustrates the pixels clicked on by the user. Specifically, the user clicked on the image using a mouse and held the mouse down to capture a small range of pixels in the image in input 220B. Input 220B captures the user gesture in one color on top of a background of a different color. Distance map 120C is illustrated as distance map 220C. Lastly, initial mask 120D is illustrated as noisy initial mask 220D.

As described herein, input 120 may also include user preference information. For example, a user may indicate the user intent of "adding" or "removing" an object from a previously selected object. In this manner, a user may indicate an "add mode" or "remove mode." Additionally or alternatively, the user may indicate a gesture preference. For example, the user may indicate that they will perform lasso gestures. Such user inputs may be received by segmentation system 200 using buttons, check-boxes, drop down menus, and the like, all displayed on a user interface.

At numeral 1, the inputs 120 are fed to the classifier system 202. The classifier system 202 is used to classify one or more inputs 120. For example, the classifier system 202 classifies a mode type (e.g., an "add mode" or a "remove mode") and a gesture type (e.g., a click (or tap), stroke (e.g., drawing, including one line strokes and back and forth scribbles), lasso (including loose lassos around the object of interest and finely traced lassos), bounding box, and the like). The classifier system 202 is described in more detail in FIG. 3.

At numeral 2, the input generator 206 receives the mode type and the gesture type determined by the classifier system 202, and additionally inputs 120. The input generator 206 is configured to transform such inputs. For example, in some embodiments, the input generator 206 transforms the inputs into a sparse vector to be received by the decoder system 204. Additionally or alternatively, the input generator 206 determines a feature map. The input generator 206 is described in more detail in FIG. 4.

At numeral 3, the decoder system 204 receives input determined by the input generator 206. For example, the decoder system 204 may receive the mode type, gesture type, and a feature map to generate a mask of an object of interest. The decoder system 204 is described in more detail in FIG. 6.

At numeral 4, the mask compiler 110 converts the mask generated from the decoder network 204 to a mask to be displayed to the user. As described herein, the mask compiler 110 transforms the probabilities of pixels being a "1" or a "0" (e.g., included as part of the mask or excluded from the mask) into colors to be displayed to a user. The mask compiler 110 generates output 122 displayed to the user, where the output 122 is an image with a masked object of interest (e.g., the captured object).

Figure 3:
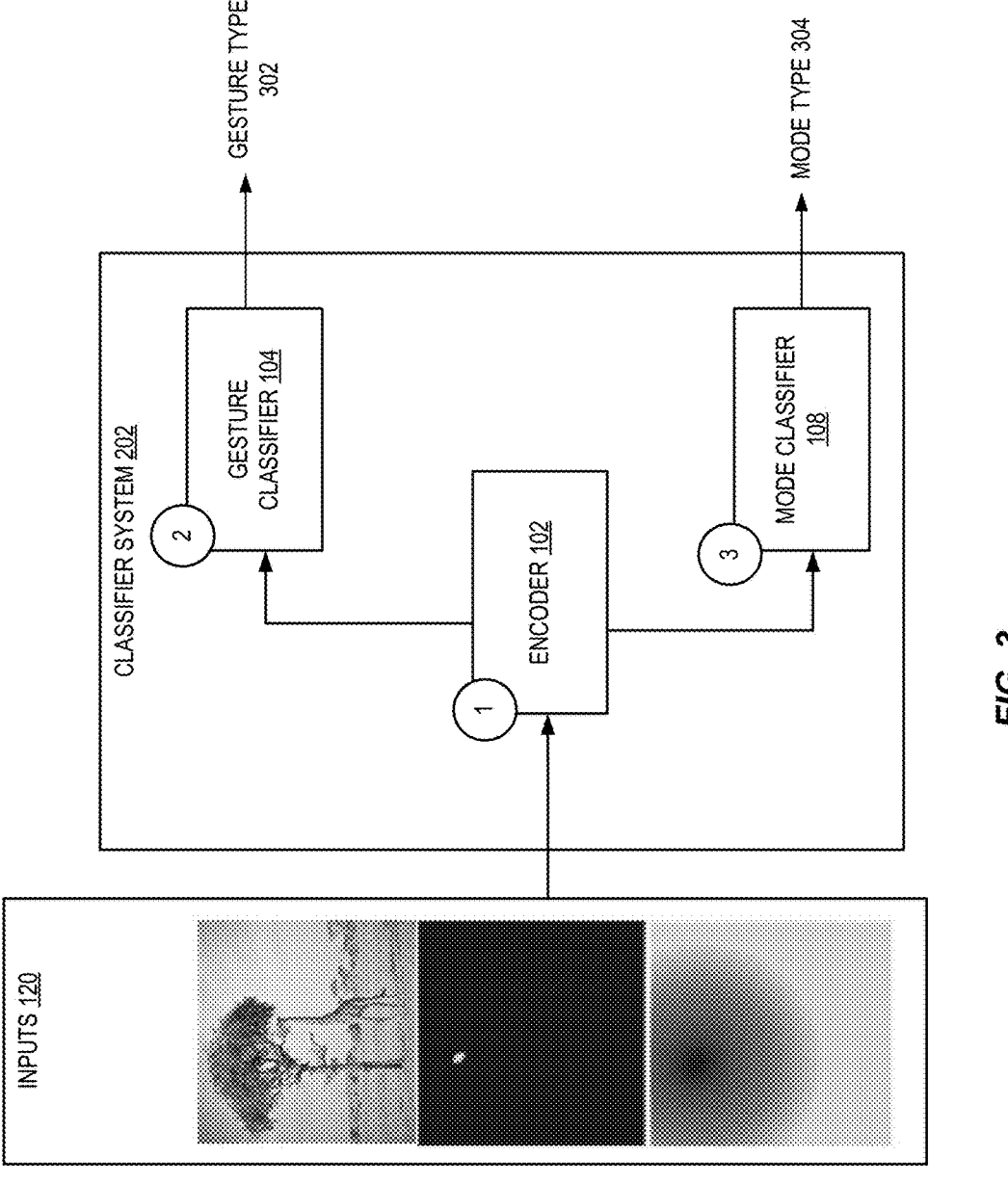
FIG. 3 illustrates an example classifier system, in accordance with one or more embodiments.

FIG. 3 illustrates an example classifier system 202, in accordance with one or more embodiments. As shown in example 300 of FIG. 3, the classifier system 202 receives inputs 120 including inputs 220A-220C.

It should be appreciated that other inputs 120 may be received by the classifier system 202. For example, the classifier system 202 may receive input 220A and 220B or input 220A and input 220C. Additionally or alternatively, other inputs such as user preferences may be received by the classifier system 202. For example, a user may indicate the user intent of "adding" or "removing" an object from a previously selected object. In this manner, a user may indicate an "add mode" or "remove mode." Additionally or alternatively, the user may indicate a gesture preference. For example, the user may indicate that they will perform lasso gestures. Such user inputs may be received by segmentation system 100 using buttons, check-boxes, drop down menus, and the like, all displayed on a user interface.

At numeral 1, the inputs 120 are fed to encoder 102. As described herein, the encoder 102 is configured to determine a latent space representation of inputs 120, which is a feature map of extracted properties/characteristics of inputs 120.

At numeral 2, the gesture classifier 104 classifies a user gesture using the feature map from the encoder 102. As described herein, the gesture classifier 104 classifies a user gesture as one of a click (or tap), stroke (e.g., drawing, including one line strokes and back and forth scribbles), lasso (including loose lassos around the object of interest and finely traced lassos), bounding box, and the like. The gesture classifier 104 may be any classifier including a multi layer perceptron. The classified gesture is output of the classifier network 202 as gesture type 302.

At numeral 3, a mode classifier 108 classifies the mode corresponding to the user gesture using the feature map extracted from the encoder 102. As described herein, the mode is an intended operation of a user. The mode classifier 108 may be any classifier including a multi layer perceptron. The classified mode is output of the classifier network 202 as mode type 304.

Figure 4:
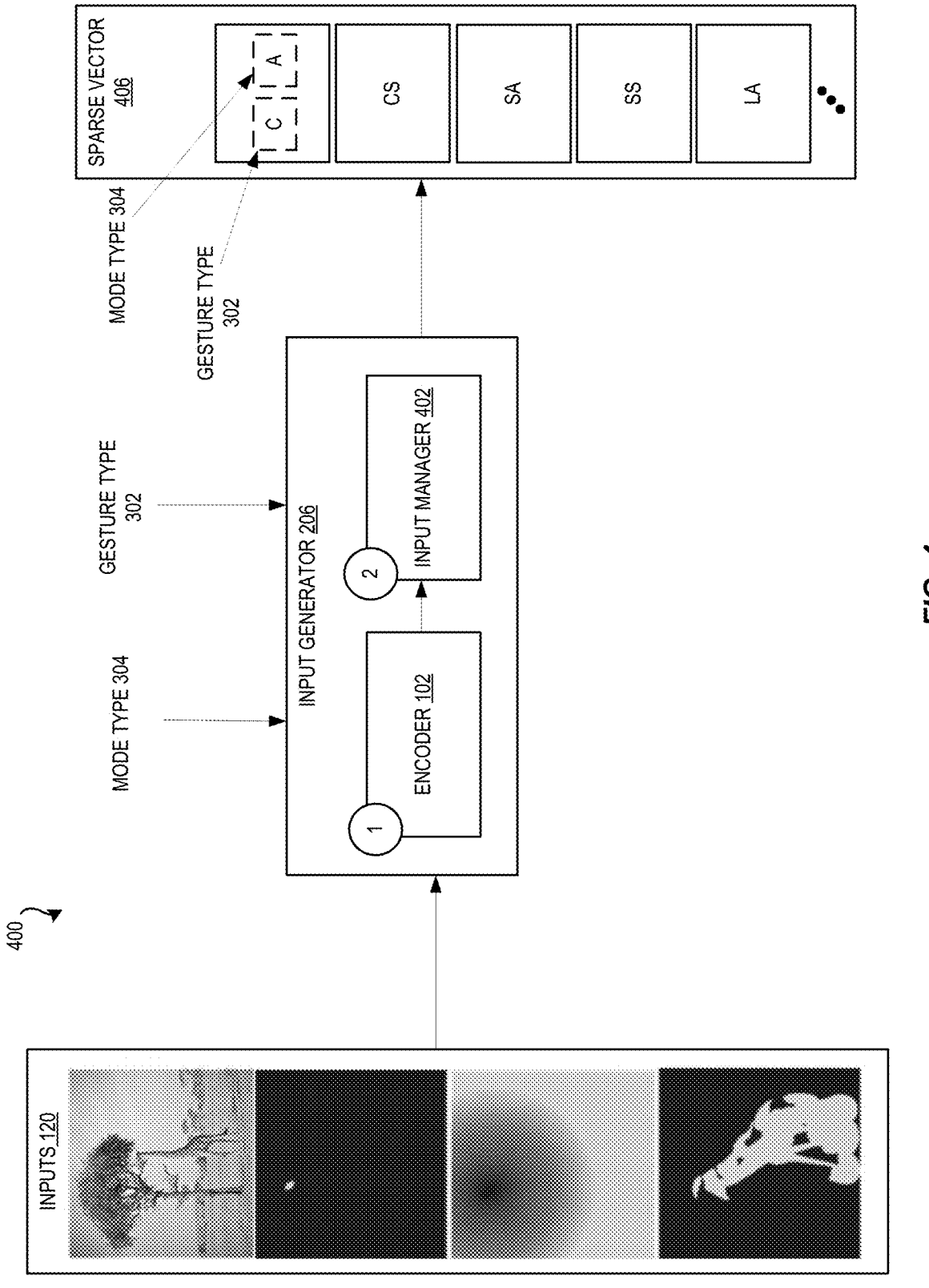
FIG. 4 illustrates an example input generator, in accordance with one or more embodiments.

FIG. 4 illustrates an example input generator 206, in accordance with one or more embodiments. As illustrated in example 400 of FIG. 4, the input generator 206 is configured to receive inputs 120 and outputs from the classifier system 202 (such as the mode type 304 and the gesture type 302). As described herein, inputs 120 can include one or more of inputs 220A-220D. Additionally or alternatively, other inputs such as user preferences may be part of input 120. In some implementations, the input generator 206 is configured to receive a feature map (not shown) generated as part of the classifier system 202.

At numeral 1, an encoder 102 is configured to determine a latent space representation of inputs 120, which is a feature map of extracted properties/characteristics of inputs 120. In the embodiments where the feature map is received as an input from the classifier system 202, the encoder 102 may not be executed.

At numeral 2, the input manager 402 manages the feature map (e.g., determined from encoder 102 and/or determined from the classifier system 202), the mode type 304, and the gesture type 302. The input manager 402 generates a sparse vector 406. Each index in the sparse vector 406 indicates a gesture type and mode type. For example, index "CA" indicates a click gesture and an add mode, index "CS" indicates a click gesture and a subtract mode (or remove mode). Similarly, index "SA" indicates a stroke gesture and an add mode, and "SS" indicates a stroke gesture and a subtract mode. By padding the vector with zeroes and filling in the kth index of the vector, the kth gesture/mode is indicated to the decoder system 204. In some embodiments, the kth index of the vector is filled in using the feature map and/or one or more inputs as part of input 120. In other embodiments, the input manager 402 one-hot encodes the sparse vector such that a value of "1" fills in the kth index of the vector and the other indices of the vector are filled in with a value of "0." In these embodiments, the input manager 402 provides, as an output, the sparse vector in addition to the feature map and/or one or more inputs as part of input 120.

Figure 5:
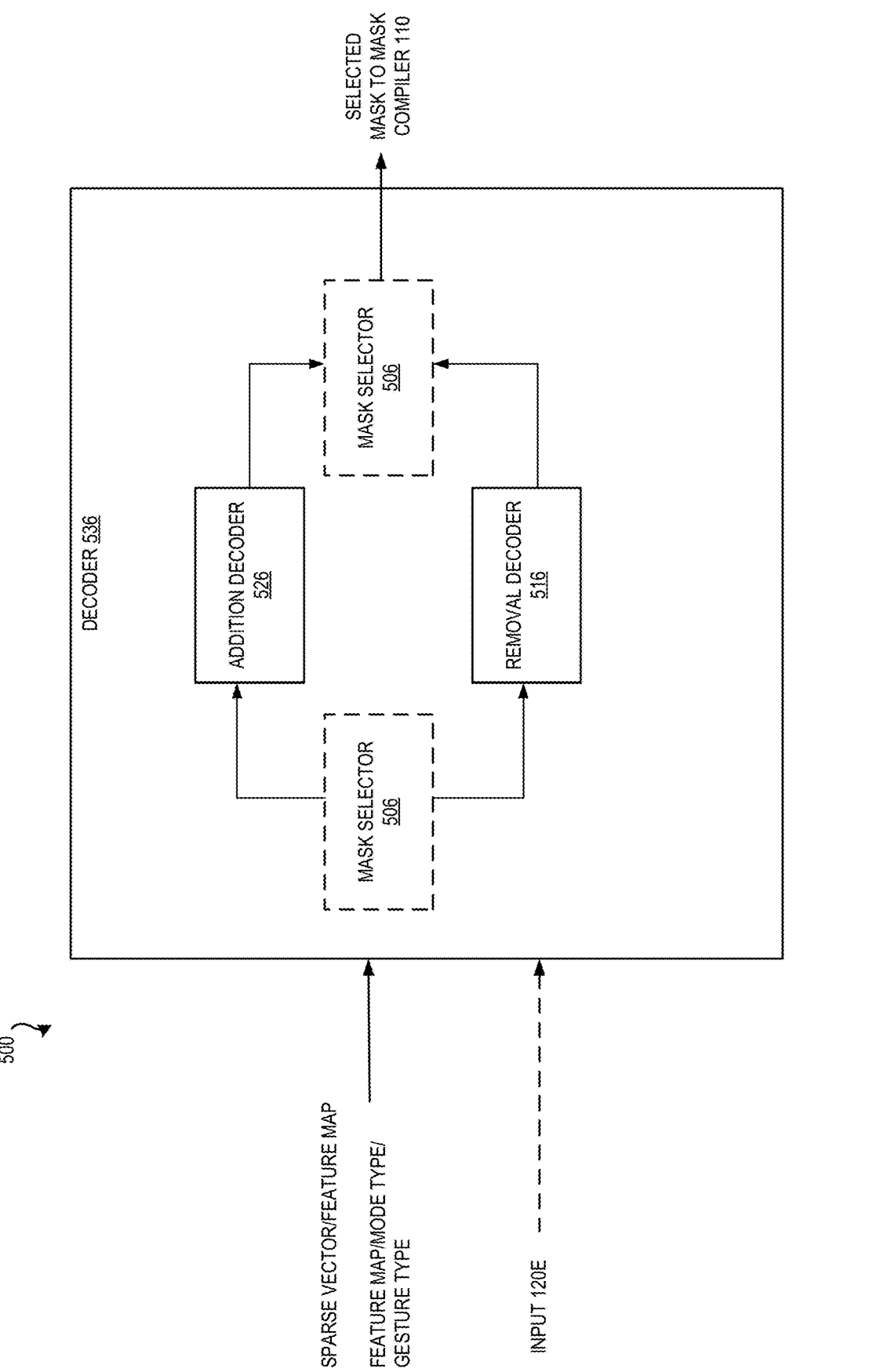
FIG. 5 illustrates an example decoder, in accordance with one or more embodiments.

FIG. 5 illustrates an example decoder, in accordance with one or more embodiments. As shown, the decoder 536 includes an ensemble of mode-specific decoders (e.g., addition decoder 536 and removal decoder 516).

As shown in example 500 of FIG. 5, the decoder 536 receives inputs including a mode type such as "add" or "remove" (e.g., the output from the mode classifier 108) one or more feature maps (e.g., the output from encoder 102 and/or a memory network 130). In some embodiments, the decoder 536 also receives input 120E. As described herein, the user may input a user preference such as a user intent of "adding" or "removing" an object (e.g., from a previously selected object). Such an input is fed to the decoder 536, and specifically to the mask selector 506, as described herein. The decoder 536 may also be configured to receive additional inputs such as inputs 120A-120D (in addition to, or instead of, the one or more feature maps).

The addition decoder 526 generates a mask of the object of interest by adding pixels. The addition decoder 526 is configured to perform the "add mode." As described herein, in "add mode," the addition decoder 526 "adds" pixels to the generated mask of the object of interest. As described herein, if there is not a previously captured object of interest (e.g., no input 120D, no initial mask), then the addition decoder 526 "adds" pixels to generate the mask of the object of interest. If there is a previously captured object of interest (indicated by input 120D, a previously selected object mask), then the addition decoder 526 "adds" pixels of the captured object to the initial mask. In this manner, the initial mask is corrected (or otherwise revised) to include the additional pixels of the captured object. The addition decoder 526 may be any suitable decoder configured to perform dense prediction tasks (such as pixel level predictions). For example, the addition decoder 526 may be a feature pyramid network (FPN).

The removal decoder 516 generates a mask of the object of interest by removing pixels. The removal decoder 516 is configured to perform the "removal mode." As described herein, in "remove mode", the removal decoder 516 "removes" pixels from a previously captured object of interest (e.g., the initial mask, indicated by input 120D) of the captured object of interest. In this manner, the initial mask is corrected (or otherwise revised) to remove pixels of the captured object.

In some embodiments, responsive to the received mode type and/or user preference (e.g., input 120E), the mask selector 506 selects either the addition decoder 526 or the removal decoder 516 to generate a mask. In this manner, one mask is generated per iteration. The generated mask is output to the mask compiler 110. In other embodiments, both the addition decoder 526 and the removal decoder 516 generate a mask. In this manner, two masks are generated per user input. In these embodiments, the mask selector 506 selects a mask to provide to the mask compiler 110.

The mask selector 506 may select the mask to provide to the mask compiler 110 according to the mode type (e.g., the output from the mode classifier 108). For example, if the mode classifier 108 determines that the mode type is the "add mode" based on the likelihood of the "add mode" class being higher than the "remove mode" class, then the mask generated by the addition decoder 526 is selected by the mask selector 506. Additionally or alternatively, the mask selector 506 triggers execution of the addition decoder 526. The generated mask is subsequently provided to the mask compiler 110.

In contrast, if the mode classifier 108 determines that the mode type is the "remove mode" based on the likelihood of the "remove mode" class being higher than the "add more" class, then the mask generated by the removal decoder 516 is selected by the mask selector 506. Additionally or alternatively, the mask selector 506 triggers execution of the removal decoder 516. The selected mask is subsequently provided to the mask compiler 110.

Additionally or alternatively, the mask selector 506 selects a mask to provide to the mask compiler 110 based on input 120E. For example, a user may indicate a preference for "add mode" or "remove mode."

In some embodiments, when the decoder 536 generates both masks, the user may flip between a mask generated from "add mode" (e.g., adding pixels of the object of interest to the mask) and a mask generated from "remove mode" (e.g., removing pixels of the object of interest from the mask).

The generated masks of the decoder 536 are created from a decoder trained to generate masks in the "add mode" or "remove mode." Accordingly, the generated masks may be more accurate than a mask generated by a single decoder module configured to perform both "add mode" and "remove mode" (such as decoder 106 of FIG. 1). When the decoders of the decoder network 536 are trained in an end-to-end network, the decoder associated with the predicted mode is updated. That is, the addition decoder 526 is trained when the output from the mode classifier 108 is "add mode", and the removal decoder 516 is trained when the output from the mode classifier 108 is "removal mode." Training the addition decoder 526 and the removal decoder 516 in an end-to-end network, the addition decoder 526 and the removal decoder 516 learn any interplay of features inherent in the mode type and the generated mask. Training is described in more detail with reference to FIGS. 7 and 8.

Figure 6:
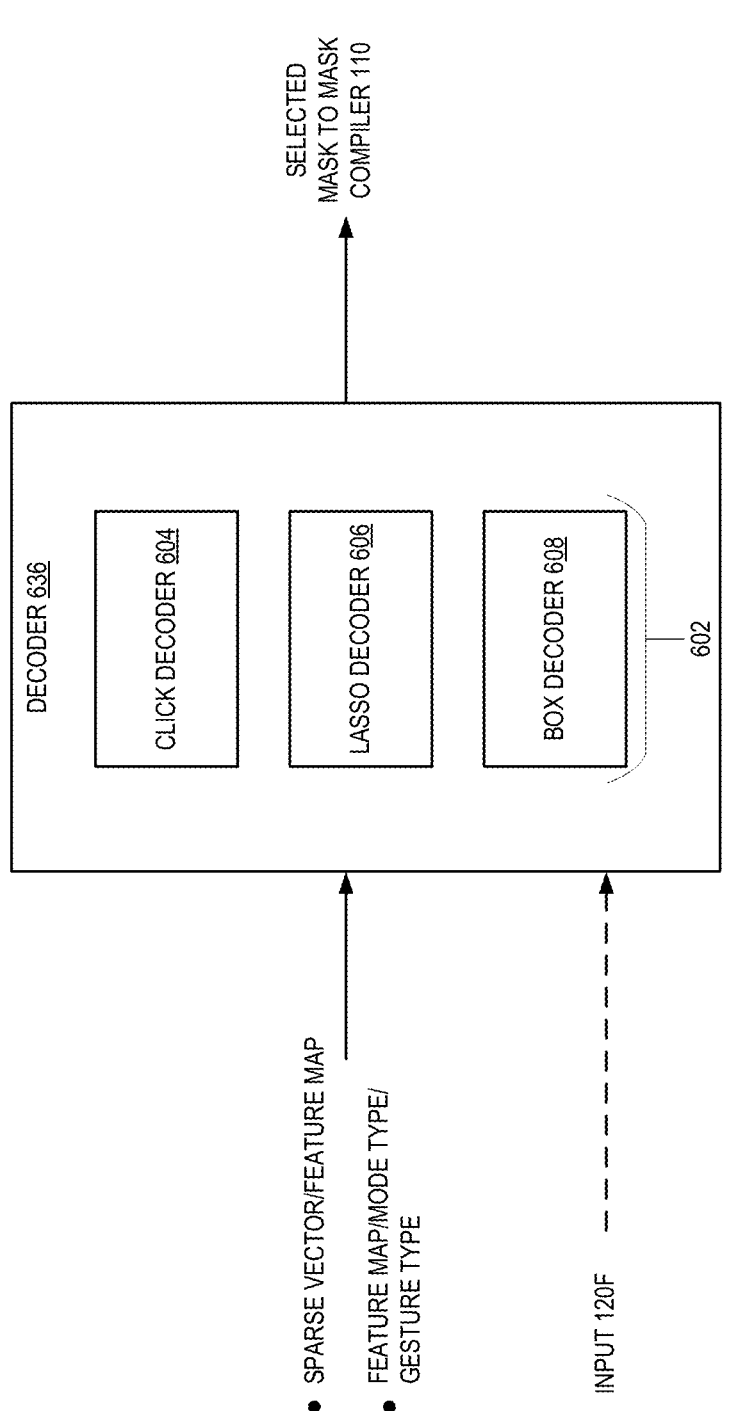
FIG. 6 illustrates an example a decoder, in accordance with one or more embodiments.

FIG. 6 illustrates an example of a decoder, in accordance with one or more embodiments. As described with reference to FIG. 2, the decoder 636 may receive a sparse vector (e.g., determined from input generator 206). As described herein, the sparse vector may indicate a mode type and gesture type using one hot encoding. Additionally or alternatively, the sparse vector may include a feature map of inputs 120. As described with reference to FIG. 1, the decoder system 204 may receive a feature map (e.g., from encoder 102 and/or memory network 130), a gesture type, and a mode type. In some embodiments, the decoder 623 receives a user preference (e.g., input 120F, not shown) that indicates the gesture to be performed.

The decoder 636 includes an ensemble of gesture-specific decoders 602. Each decoder of the gesture-specific decoders 602 is executed responsive to a corresponding classified gesture type. As described herein, the gesture type may be received as part of the sparse vector, the output of the gesture classifier, and/or a user preference. For example, when the gesture type is classified as a click, the click decoder 604 is triggered to generate a mask. Similarly, when the gesture type is classified as a lasso, the lasso decoder 606 is triggered to generate a mask. Each decoder of the gesture-specific decoder 602 generates a mask, where the mask indicates a probability of a pixel belonging to an object of interest. Moreover, each of the gesture-specific decoders 602 is trained to generate one or more masks associated with a specific gesture. In operation, the gesture-specific decoder is fed training data associated with the specific gesture. That is, training inputs corresponding to a specific gesture is input to the specific gesture-specific decoder. Training is described in more detail with reference to FIGS. 7 and 8. As described herein, the mask indicates a probability of a pixel belonging to an object of interest (captured as part of inputs 120). In some embodiments, each gesture-specific decoder may be a network and generate one or more masks based on the received mode type 304, as described with reference to FIG. 5.

Figure 7:
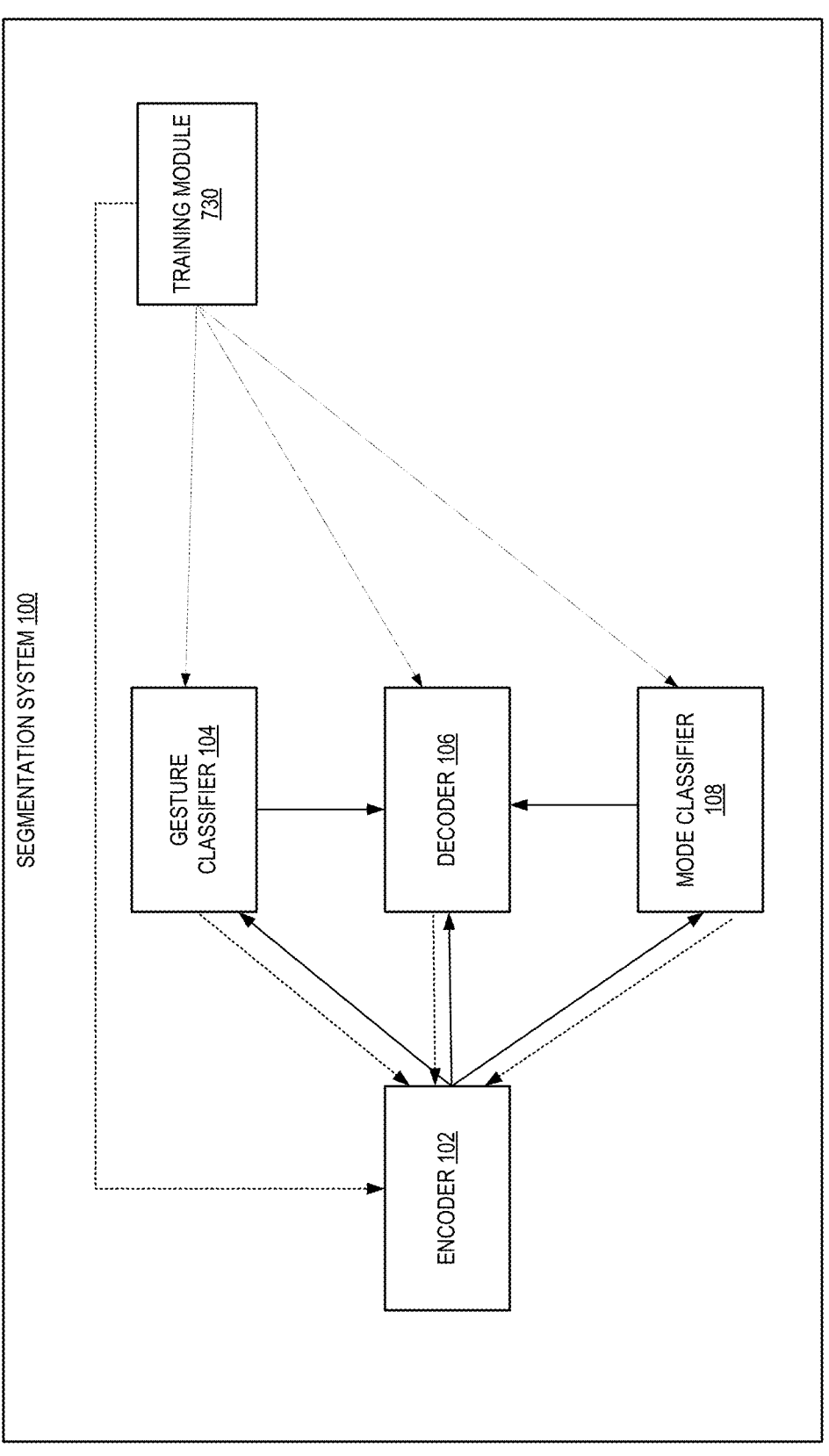
FIG. 7 illustrates training the multi-headed architecture of the segmentation system, in accordance with one or more embodiments.

FIG. 7 illustrates training the multi-headed architecture of the segmentation system, in accordance with one or more embodiments. Multitask learning is when a single ML model is trained to perform multiple tasks. The tasks performed by the segmentation system 100 include classifying the gesture (via the gesture classifier 104), generating a mask (via the decoder 106), and classifying a mode (via the mode classifier 107). A model that is trained using multitask learning includes one or more shared "backbone" layers and "heads" dedicated to perform a specific task. Each head includes a machine learning model required to perform/learn the specific task associated with that head. That is, each head may utilize a unique loss function to train the particular head to perform a task. Multitask learning improves efficiency as each head receives the same set of features (or other information) determined from the shared portion of the ML model. That is, for a three-headed model, the features received by each head are computed once (e.g., by the shared backbone) instead of three time if each head of the model was its own machine learning model. This efficient sharing is useful in cases where the multitask model learns related tasks.

The shared backbone of the multitask learning model is shown as encoder 102. As described herein, the feature map determined from the encoder 102 is provided to the gesture classifier 104 head, the decoder 105 head, and the mode classifier 108 head. Each of the gesture classifier, decoder 106, and mode classifier 108 use the feature map determined by the encoder 102 for training. As described with reference to FIG. 8, the training module 730 is configured to provide each head training data to be used in supervised learning. The training module 730 provides training data (e.g., input-output pairs) to the decoder 106, the mode classifier 108, and the gesture classifier 104 (collectively referred to herein as ML heads 808). The error of each head is determined, and passed to the encoder 102 such that the feature maps determined by the encoder are tuned according to the error of each of the heads performing their respective tasks.

The gesture classifier 104 is trained to predict a gesture using the feature map determined by the encoder 102 and gesture movements with corresponding gesture labels. The mode classifier 108 is trained to predict a mode using the feature map determined by the encoder 102 and initial masks with corresponding masked objects. The decoder 106 is trained to generate a mask given the feature map determined by the encoder 102 and images with corresponding masked objects. In some embodiments, the decoder 106 is trained using the classified mode determined by the mode classifier 108 and the classifier gesture determined by the gesture classifier 104. However as shown, the error determined from the mask generated by the decoder 106 is not passed to the mode classifier 108 and/or the gesture classifier 104. Additionally or alternatively, the training module 730 provides the decoder 106 a mode type and/or a gesture type.

Figure 8:
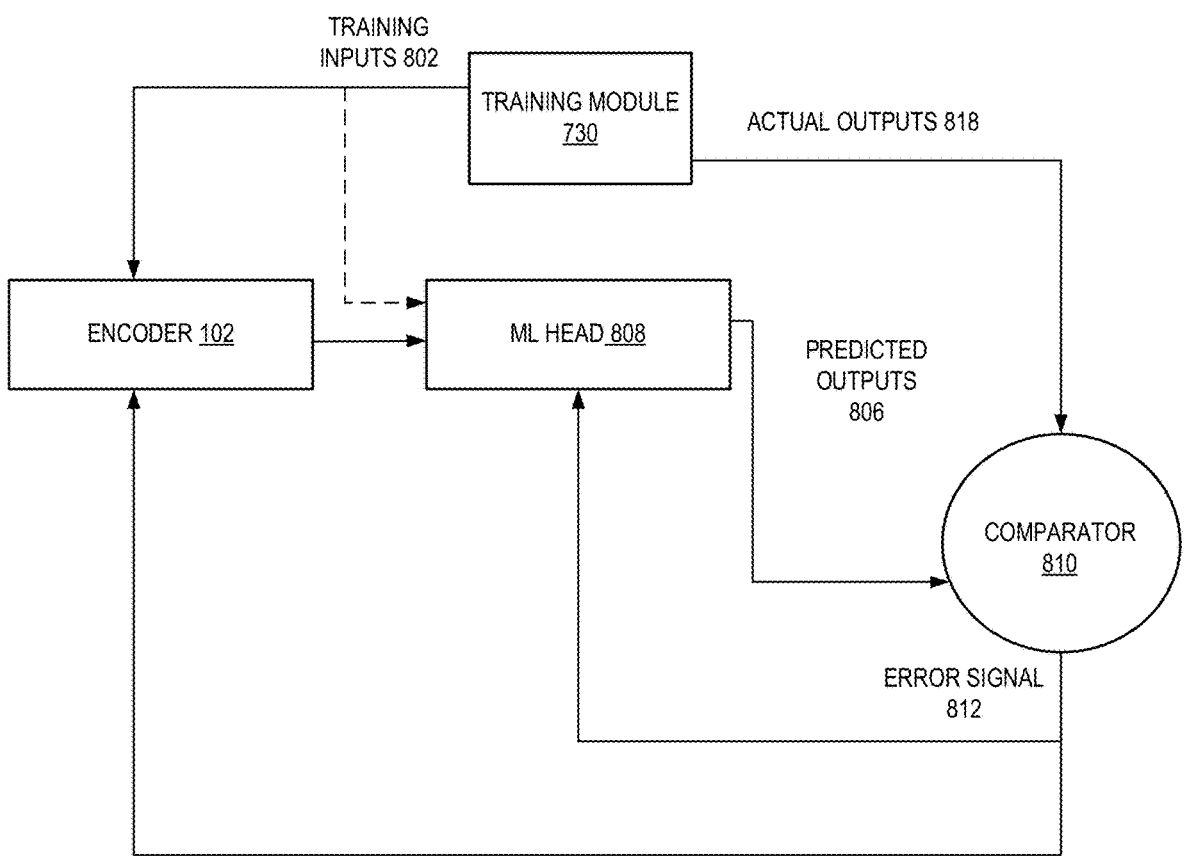
FIG. 8 illustrates an example process of supervised learning used to train the each of the ML heads, in accordance with one or more embodiments.

FIG. 8 illustrates an example process of supervised learning used to train the each of the ML heads, in accordance with one or more embodiments. Supervised learning is a method of training a machine learning model given input-output pairs. An input-output pair is an input with an associated known output (e.g., an expected output, a labeled output, a ground truth). The training module 730 is used to train the decoder on input-outputs pairs such that the decoder learns how to predict known outputs (e.g., an image with a masked object) given known inputs (e.g., a clean image). Similarly, the training module 730 is used to train the gesture classifier 104 and the mode classifier 108 to learn how to predict known outputs (e.g., a classified gesture and a classified mode respectively) given known inputs (a labeled gesture type and a labeled mode type respectively). The training module 730 also trains the encoder based on the accuracy of ML heads 808.

The training module 730 obtains training data by querying one or more data stores (internal to the segmentation system 100 or external to the segmentation system 100) for datasets including masked regions of an image (e.g., objects or sub-objects). The datasets include clean images (used as part of the training inputs 802) and corresponding images with masked objects (or sub-objects) in each image (used as the actual output 818). For ease of description, the present disclosure describes learning to generate masks from objects in an image, but it should be appreciated that the training module 730 trains the encoder 102/decoder 106 to generate masks for sub-objects in the image (or other groups of pixels). In some implementations, the dataset received by the training module 730 includes masks for many objects in an image and the training module 730 selects one masked object in the image for use as training data (e.g., actual output 818). Such training data can be used to train the encoder 102/decoder 106 to generate a mask of an object (or sub-object) in an image without any prior mask inputs (e.g., without input 120D).

The training module 730 is also configured to obtain an initial mask. In some embodiments, the initial mask simulates receiving input 120D, where the initial mask received as input 120D represents a mask from an upstream processing device and/or a mask from a previous iteration of the segmentation system 100. The initial mask indicates a noisy (or corrupt) mask that the user is correcting. When training the decoder, the corresponding actual output 818 is the image with the masked object.

In other embodiments, the initial mask represents an initially captured region (or group of pixels). As described herein, the initial mask representing the initially captured region may be a historic mask (determined by one or more upstream processes and/or a user selection), or a noisy mask (synthetically generated by corrupting a mask and/or a user selection). In some embodiments, the initial mask includes multiple captured regions of an image. For example, two masked objects in the same image (obtained from the data store) may be combined.

By comparing an image with a masked object (e.g., obtained from the data store) to the initial mask, the training module 730 can determine whether pixels were added or subtracted from the image with the masked object. In this manner, the training module 730 determines a mode type (e.g., "add mode" or "remove mode") between the initial mask and the corresponding masked object.

If pixels were added to the initial mask (or the initial mask includes two masked objects), then to produce the image with the masked object the training module 730 should remove pixels. Accordingly, the training module 730 determines the mode type corresponding to the initial mask is "remove mode." If pixels were removed from the image with the masked object to produce the initial mask, then the training module 730 determines the mode type corresponding to the initial mask is "add mode." In these embodiments, the determined mode type is the actual output 818.

In some embodiments, the training module 730 is configured to generate an initial mask by corrupting an image with a masked object received from one or more data stores. The training module 730 may corrupt the image with the masked object using any one or more suitable means of injecting noise into one or more objects of the masked image.

In some embodiments, the training module 730 generates the initial mask (otherwise referred to herein as a "corrupt mask") using one or more functions to create a shape and mask") and add/subtract the shape from a mask. For example, the training module 730 can add/remove pieces of a mask by adding/removing the pixels belonging to an ellipse generated randomly along the object boundary. The addition or removal of such pixels simulates an imperfect mask received from one or more downstream processes and/or received at a previous iteration of the segmentation system 100. Additionally or alternatively, the addition or removal of such pixels simulates a captured group of pixels. As described herein, the mode classifier and/or encoder predict a user intent (e.g., whether to add the captured group of pixels or remove the captured group of pixels, otherwise referred to herein as the mode type), using the captured group of pixels (e.g., the corrupt initial mask) and the image with the masked object (e.g., the target mask, or the intent of the user).

The training module 730 may also corrupt the mask by applying one or more morphological operations to the mask. For example, the training module 730 may apply a dilation morphological operation, in which pixels are added to boundary of the object, increasing the size of the mask. The training module 730 may also apply an erosion morphological operation, in which pixels are removed along the boundary of the object, simulating in missing portions of the mask. In some embodiments, the corrupted masked image is provided as an input (e.g., training input 802) to the encoder 102 and the decoder 106 (e.g., ML head 808), and the non-corrupted masked image is provided as the actual outputs 818. In other embodiments, the corrupted masked image is provided as an input (e.g., training input 802) to the encoder 102 and the mode classifier 108 (e.g., ML head 808), and the non-corrupted masked image is used to determine a mode type based on whether pixels were added or removed between the corrupted masked image and the non-corrupted masked image. In these embodiments, the label is provided as the actual output 818.

In some embodiments, instead of corrupting the mask, the training module 730 obtains a training input 802 simulating the initial mask input (e.g., input 120D) by retrieving one or more previous (referred to herein as historic) initial masks. The historic masks may be masks determined by the one or more upstream processes configured to generate masks and stored by the training module 730. The historic mask may also be a previous user selection of a group of pixels. Training the encoder 102 and the decoder 106/mode classifier 108 (e.g., ML head 808) using such historic masks allows the encoder 102 and the decoder 106/mode classifier 108 to be trained with respect to the specific upstream processes that generated the initial masks. That is, the decoder 106, mode classifier 108, and/or encoder 102 will learn to correct the imperfections of the one or more upstream systems.

For example, an upstream machine learning model may be trained to generate a mask of an object in an image. By providing the encoder 102 and decoder 106 the mask determined by the upstream machine learning model, the encoder 102 and decoder 106 learn the types of mistakes generated by the upstream machine learning model and can correct such mistakes. In such embodiments, the historic masks are the training inputs 802 and a corresponding actual masked image is the actual output 818. In some embodiments, the training module 730 may obtain a historic mask and further corrupt the mask using any suitable method. By corrupting the historic mask, the training module 730 is training the encoder 102 and decoder 106 to be robust to noise/errors received from the one or more upstream systems.

Other types of training data obtained by the training module 730 include the gesture map (e.g., input 120B) and/or the distance map (e.g., input 120C). In some embodiments, the training module 730 obtains the gesture map and/or distance map from one or more users. For example, a user may be prompted to capture an object in an image by drawing a bounding box over the object. In this manner, the actual output 818 (e.g., the labeled gesture type) is known to be "bounding box" because the user was prompted to use the bounding box. The corresponding input responsive to the "bounding box" prompt is the training input 802 (e.g., the gesture map and/or the distance map). The training module 730 may query one or more data stores to obtain gesture input-output pairs (e.g., the labeled gesture type and the corresponding gesture map and/or distance map).

In some embodiments, the training module 730 obtains gesture input-output pairs using user feedback. For example, the user may interact with an object in an image to capture the object. Such inputs (e.g., the image, the gesture map, the distance map, and the like) are provided to the segmentation system and the processes described herein are executed to return, to the user, the predicted captured object of the image. In some embodiments, the user may indicate the gesture used to capture the object. In this manner, the training module 730 obtains a gesture type (e.g., the user indicated gesture) and the gesture map and/or distance map (the result of the user performed gesture).

In some embodiments, the training module 730 uses class-specific gesture input-output pairs for training. For example, the training module 730 obtains input-output pairs of people of a certain age, people of a certain geographic location, an individual person, people associated with a certain health condition (e.g., tremors), and the like. In this manner, the encoder 102, the decoder 106, the gesture classifier 104 and the mode classifier 108 are trained according to the specific class.

In some embodiments, the training module 730 obtains gesture input-output pairs using one or more machine learning models trained to generate a gesture map and/or distance map (e.g., the actual output 818) of a particular gesture input (e.g., the training input 802).

Additionally or alternatively, the training module 730 is configured to generate gesture input-output pairs using an image with a masked object. As described herein, the training module 730 is configured to obtain images with one or more masked objects by querying one or more data stores. To generate gesture input-output pairs, first, the training module 730 labels the gesture map and/or distance map to be generated. Such labeling is the actual output (e.g., actual output 818). Next, the training module 730 is configured to utilize the masked object in the obtained image to generate a gesture. In some embodiments, the training module 730 generates the gesture map and/or distance map based on the generated gesture. Such generated gesture maps and/or distance maps are used as training inputs 802.

In some embodiments, the training module 730 expands (or shrinks) the mask used to generate the gesture. Moreover, in some embodiments, the training module 730 jitters the selected points by the training module 730. For example, the training module 730 selects a point for a gesture type, as described herein, and subsequently applies a jitter function to the selected point. In other embodiments, the training module 730 applies one or more constraints to the selected points (and/or any interpolated lines/curves resulting from the selected points). For example, points may be constrained to a threshold distance away from the boundary of the masked object.

For ease of description, the present disclosure describes generating gestures using a masked object in an image. However, it should be appreciated that gestures may also be generated using masked sub-objects of an image. For example, the training module 730 may perform a connected component analysis using any suitable mechanism and generate a gesture on a component resulting from the connected component analysis.

For example, the training module 730 generates a "click" type gesture by randomly selecting (or otherwise sampling) a point inside (or on the boundary of) the masked object. In this manner, the training module 730 simulates a user selecting a point corresponding to an object of interest.

To generate a "stroke" gesture, the training module 730 randomly selects more than one point inside (or on the boundary of) the masked object. Subsequently, the training module 730 interpolates the selected points. The training module 730 can use any method of interpolation. For example, the training module 730 interpolates the points using a straight line, a jagged line, a curve, and the like.

To generate a "lasso" gesture, the training module 730 randomly selects more than one point on the boundary of the masked object. The number of selected points can be used to simulate the degree of accuracy of the lasso gesture. For example, increasing the number of selected points simulates a user tracing the boundary of the object. Such tracing of the object is considered a high accuracy gesture. In contrast, decreasing the number of selected points simulates a user loosely tracing the object. Such loose tracing of the object is considered a low accuracy gesture. The training module 730 can use any method of interpolating the selected points. For example, the training module 730 interpolates the points using a straight line, a jagged line, a curve, and the like. In some embodiments, after the lasso gesture is created, the training module 730 subtracts one or more points to simulate the user not completing the lasso. For example, a single point may be subtracted from the lasso gesture to "open" the lasso. Additionally or alternatively, the training module 730 adds one or more points to simulate the user crossing over the lasso gesture. For example, a single point may be added to the lasso gesture to simulate the ends of the lasso crossing over itself.

To generate a "bounding box" gesture, the training module 730 generates a rectangle (or square) around the boundary of the masked object. Subsequently, the training module 730 randomly shifts the location of the rectangle in any direction and/or randomly grows (or shrinks) the size of the generated rectangle. In this manner, the training module 730 simulates a user selecting drawing a bounding box around one or more portions of the object of interest.

To train the decoder 106 (e.g., ML head 808), the training module 730 provides a clean image (e.g., an image without any masked objects/sub-objects) to the encoder 102 as a training input 802. In some embodiments, the training module 730 also provides the clean image to the decoder 106 (e.g., ML head 808). The encoder 102 extracts a feature map from the clean image, and the decoder 106 predicts a masked object of the clean image (e.g., predicted output 806). In some embodiments, the prediction of the mask of the object is a binary classification of each pixel in the image belonging to the mask in the image. For example, pixels classified with "0" do not belong in the predicted mask output (e.g., predicted output 806), and pixels classified with "1" do belong in the predicted mask output (e.g., predicted output 806).

In some embodiments, the training module 730 is configured to provide, as part of training inputs 802 provided to the encoder 102 and/or decoder 106 (e.g., ML head 808), the initial mask. In these embodiments, the training module 730 provides the initial mask and the clean image as inputs to the encoder 102. In some embodiments, the training module 730 provides one or more of the initial mask and the clean image as inputs to the decoder 106 (e.g., ML head 808). In these embodiments, the decoder 106 also receives a feature map of the clean image and/or a feature map of the initial mask determined from the encoder 102. The decoder 106 (e.g., ML head 808) is trained to predict the mask (e.g., predicted output 806) using the initial mask and the clean image (e.g., the feature map of the initial mask and/or feature map of the clean image). In some embodiments, the training module 730 also provides the gesture map and/or distance function as part of training inputs 802 to the encoder 102 and/or decoder 106 (e.g., ML head 808).

The decoder 106 (e.g., ML head 808) uses the feature map (e.g., determined by encoder 102) to predict output 806 by applying the current state of the decoder 106 to the inputs of the decoder 106 (e.g., the feature map determined by the encoder 102 and/or the training inputs 802). Subsequently, each of the pixels in the predicted output 806 are compared using the comparator 810 to the actual output 818 (an image with a masked object) to determine an amount of error or different from the predicted output 806 to the actual output 818.

To train the gesture classifier 104 (e.g., ML head 808), the training module 730 provides the generated gesture maps and/or distance maps to the encoder 102 as part of training inputs 802. In some embodiments, the training module 730 also provides the generated gesture map and/or distance map to the gesture classifier 104 (e.g., ML head 808). Additionally or alternatively, other information such as the clean image (e.g., the image without any masked objects) and the initial mask is provided to the encoder 102 and/or gesture classifier 104. The encoder 102 extracts a feature map from the training inputs 802 (e.g., the gesture map, distance map, clean image, and/or initial mask) and the gesture classifier 104 predicts the gesture type.

The gesture classifier 104 (e.g., ML head 808) uses the feature map determined by the encoder 102 to predict output 806 by applying the current state of the gesture classifier 104 to the feature map. Specifically, the gesture classifier 104 outputs a probability distribution of the input gesture map and/or distance map belonging to each gesture class (e.g., a click, a stroke, a lasso, a bounding box, etc.). The gesture class corresponding to the highest probability is determined to be the predicted gesture type (e.g., predicted output 806). The comparator 810 compares the predicted gesture type (e.g., predicted output 806) to the actual output 818 (e.g., the labeled gesture type) to determine an amount of error.

To train the mode classifier 108 (e.g., ML head 808), the training module 730 provides an initial mask (e.g., a generated corrupted mask, a historic mask, etc.) to the encoder 102 as part of training inputs 802. In some embodiments, the training module 730 also provides the initial mask to the mode classifier 108 (e.g., ML head 808). Additionally or alternatively, other information such as the clean image (e.g., the image without any masked objects) is provided to the encoder 102 and/or mode classifier 108. The encoder 102 extracts a feature map from the training inputs 802 and the mode classifier 108 predicts the mode type.

The mode classifier 108 (e.g., ML head 808) uses the feature map determined by the encoder 102 to predict output 806 by applying the current state of the mode classifier 108 to the feature map. Specifically, the mode classifier 108 outputs a probability distribution of the initial mask belonging to each mode type (e.g., "add mode" or "remove mode"). The mode type corresponding to the highest probability is determined to be the predicted mode type (e.g., predicted output 806). The comparator 810 compares the predicted mode type (e.g., predicted output 806) to the actual output 818 (e.g., the labeled mode type) to determine an amount of error.

The error, represented by error signal 812, is used to adjust the weights in ML head 808 such that the ML head 808 changes (or learns). For example, the decoder 106 (e.g., ML head 808) learns to predict which pixels of the image belong in the mask, the gesture classifier 104 (e.g., ML head 808) learns to predict the gesture type, and the mode classifier 108 (e.g., ML head 808) learns to predict the mode type. Additionally, the error signal 812 is communicated back to the encoder 102 such that the encoder 102 changes (or learns) over time to predict a more accurate feature map. In some implementations, the error signal 812 is not propagated back to the encoder 102.

Each of the ML heads 808 and the encoder 102 are trained using the backpropagation algorithm. The backpropagation algorithm operations by propagating the error signal 812 through the ML head 808 and the encoder 102. The error signal 812 may be calculated each iteration (e.g., each pair of training inputs 802 and associated actual outputs 818), batch, and/or epoch and propagated through all of the algorithmic weights in the ML head 808 and encoder 102 such that the algorithmic weights adapted based on the amount of error. The error is minimized using a loss function. Non-limiting examples of loss functions may include the square error function, the root mean square error function, the Lovasz Hinge loss (or other Hinge loss), a Focal loss function, L1 loss, L2 loss, and the like.

Each ML head 808 is trained according to the error of the respective ML head 808. That is, the decoder 106 is trained according to the error signal 812 of the predicted mask output and the actual mask output, the gesture classifier 104 is trained according to the error signal 812 of the predicted gesture type and the actual gesture type, and the mode classifier 108 is trained according to the error signal 812 of the predicted mode type and the actual mode type.

Moreover, the error determined by the comparator 810 may be different for each ML head 808. For example, the comparator 810 may determine the error signal 812 using the L1 loss for the gesture classifier 104 and/or mode classifier 108. In contrast, the comparator 810 determines the error signal 812 using the binary cross entropy loss for the decoder 106.

The weighting coefficients of the ML head 808 and encoder 102 are tuned to reduce the amount of error, thereby minimizing the differences between (or otherwise converging) the predicted output 806 with the actual output 818. In operation, the gesture classifier 104 outputs a gesture classification that is similar to the actual gesture classification, the decoder 106 outputs a mask of an object in an image that is similar to the mask of the object in the image, and the mode classifier 108 outputs a mode classification that is similar to the actual mode classification. The ML head 808 are trained until the error determined by the comparator 810 is within a certain threshold (or a threshold number of batches, epochs, or iterations have been reached).

Figure 9:
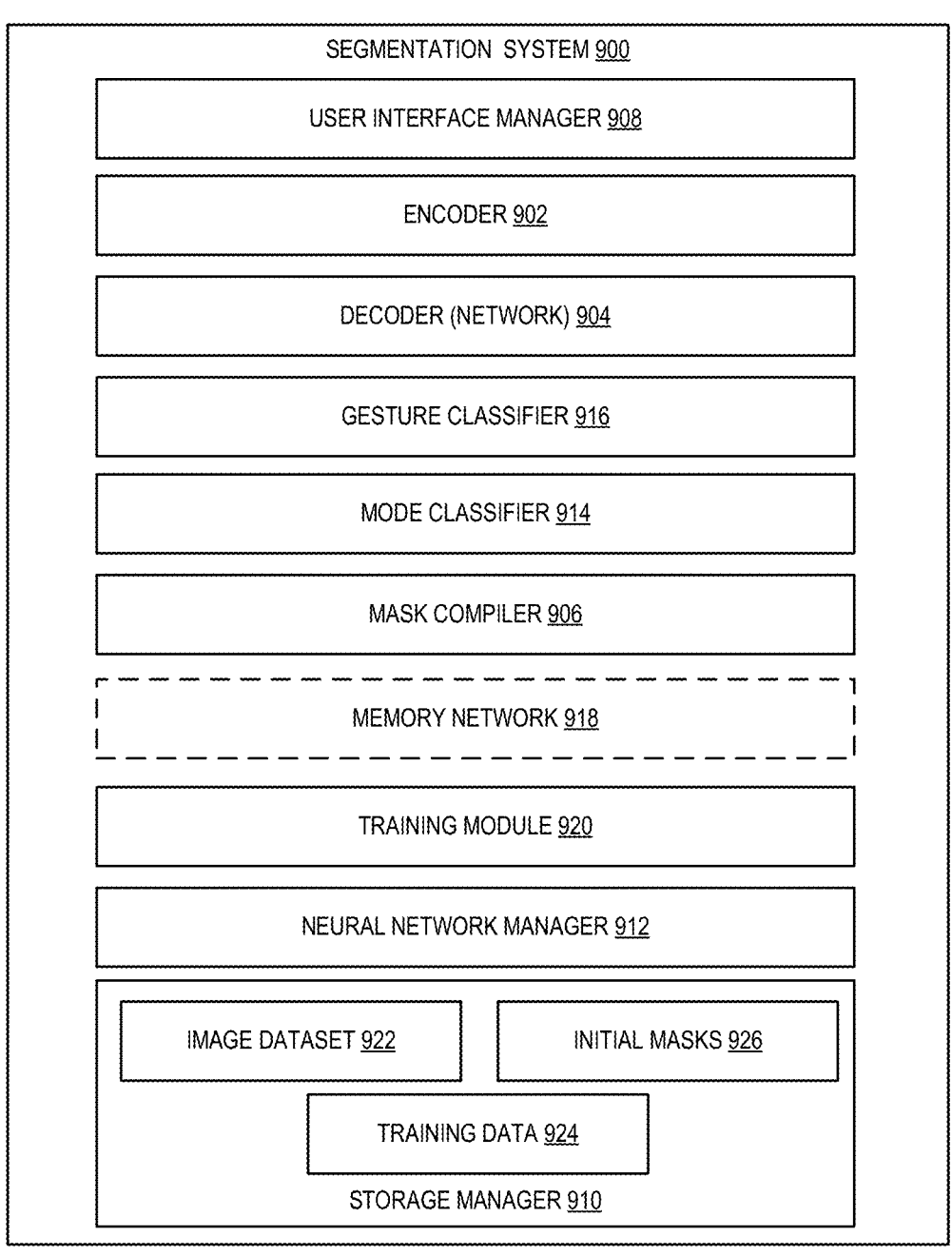
FIG. 9 illustrates a schematic diagram of segmentation system in accordance with one or more embodiments.

FIG. 9 illustrates a schematic diagram of segmentation system (e.g., "segmentation system" described above) in accordance with one or more embodiments. As shown, the segmentation system 900 may include, but is not limited to, a user interface manager 908, an encoder 902, a decoder (network) 904, a gesture classifier 916, a mode classifier 914, a mask compiler 906, a memory network 918, a training module 920, a neural network manager 912, and a storage manager 910. As described herein, with reference to FIG. 5 the decoder 904 may be decoder network 904 including sub-modules such as an addition decoder, a removal decoder, and a mask selector. Similarly, as described with reference to FIG. 6, the decoder 904 may be a decoder network 904 including gesture specific sub-modules such as a click decoder, a lasso decoder, and a box decoder. In some embodiments, as described with reference to FIG. 3, the gesture classifier 916 and the mode classifier 914 may be sub-modules of a classifier module (not shown).

As illustrated in FIG. 9, the segmentation system 900 includes a user interface manager 908. For example, the user interface manager 908 allows users to perform a gesture to indicate an object (or sub-object) of interest in an image. In some embodiments, the user interface manager 908 provides a user interface through which the user can upload the image including various objects (or sub-objects). Alternatively, or additionally, the user interface may enable the user to download the images from a local or remote storage location (e.g., by providing an address (e.g., a URL or other end-point) associated with an image source). In some embodiments, the user interface can enable a user to link an image capture device, such as a camera or other hardware to capture image data and provide it to the segmentation system 900.

Additionally, the user interface manager 908 allows users to perform one or more gestures to indicate (or otherwise capture) an object (or sub-object) of interest in the image. For example, the user interface manager 908 may record mouse movements, mouse compression/decompress (e.g., a mouse click), user interactions with a screen (e.g., haptic feedback), keyboard entries, and the like. The user interface manager 908 is further configured to receive user feedback (e.g., a gesture type performed, a gesture type to be performed, a desired mode type, a mode type to be performed, subsequent gestures to capture additional sub-objects/objects, and the like). The user interface manager 908 also enables the user to view a resulting output image including a masked object/sub-object of interest. The user is further able to refine and/or correct the masked object/sub-object of interest in the image.

As illustrated in FIG. 9, the segmentation system 900 includes an encoder 902. The encoder 902 determines a latent space representation of inputs received by the segmentation system 900. As described herein, inputs can include an image including an object of interest, a distance map, a gesture map, and/or an initial mask. The latent space representation may be a feature map extracting properties/characteristics of the inputs.

The segmentation system 900 may also include a gesture classifier 916. The gesture classifier 916 classifies a user gesture using the feature map from the encoder 902. As described herein, the gesture classifier 916 classifies a user gesture as one of a click (or tap), stroke (e.g., drawing, including one line strokes and back and forth scribbles), lasso (including loose lassos around the object of interest and finely traced lassos), bounding box, and the like. The gesture classifier 916 may be any classifier including a multi layer perceptron. The predicted gesture classification is fed as an input to the decoder (network) 904 and/or output and displayed to the user.

As illustrated in FIG. 9, the segmentation system 900 also includes a mode classifier 914. The mode classifier 914 classifies the mode corresponding to the user gesture using the feature map extracted from the encoder 902. As described herein, the mode is an intended operation of a user. The mode classifier 914 may be any classifier including a multi layer perceptron. The mode classifier 914 feeds the predicted mode to the decoder (network) 904 and/or output and displayed to the user.

The segmentation system 900 may also include a memory network 918. The memory network 918 is any network that can pass a state of the network from a first step (e.g., when a user makes a first interaction) to a next step (e.g., when the user makes a second interaction). For example, the memory network 918 can be an LSTM network that learns the dependencies of data in a sequence. The sequence, in this case, is a sequence of user gestures (data) to capture an object of interest in an image.

As illustrated in FIG. 9, the segmentation system 900 includes a decoder (network) 904. In some implementations, the decoder 904 is a single decoder module configured to perform dense prediction tasks. For example, the decoder 904 may be a FPN. The decoder 904 generates a mask of the object of interest using the feature map extracted by the memory network 918 (if there is a memory network) and/or the feature map extracted by the encoder 902, the mode type determined by the mode classifier 914, and/or the gesture type determined by the gesture classifier 916. As described herein, the mask is a probability of each pixel belonging to the object of interest.

In other implementations, as described with reference to FIG. 5, the decoder 904 is a decoder network 904 that includes various decoders such as an addition decoder, a removal decoder, and a mask selector. Additionally or alternatively, as described with reference to FIG. 6, the decoder network 904 may include gesture specific decoders such as a click decoder, a lasso decoder, a box decoder, and the like.

As a result of generating the mask (e.g., based on the gesture type, the mode type, and/or the inputs generally), an object of the image is captured or otherwise distinguished from other objects of the image. For example, the mask may highlight the object of interest in the image.

The segmentation system 900 includes a mask compiler 906 to generate a mask understandable by humans. For example, the mask compiler 906 receives the probabilities of each pixel belonging to the mask and converts the mask generated from the decoder 106 to a mask displayed to the user. Additionally or alternatively, the mask compiler 906 receives binary values of each pixel. For instance, pixels set to a value of "0" are not included in the mask while pixels set to a value of "1" are included in the mask. Subsequently, the mask compiler 906 transforms the pixel values into colors to be displayed to a user. For example, pixels set to "1" are painted a particular color (and may include a particular translucence, brightness, opacity, etc.). In contrast, pixels set to "0" are painted a particular color (e.g., black) and/or are mapped to the initial color of the pixel in the input image (e.g., input 120A). In this manner, the mask compiler 906 provides an output image including a masked object, where the masked object includes pixels of a particular color and non-masked objects retain their original color as provided in the input image.

As illustrated in FIG. 9, the segmentation system 900 also includes a training module 920. The training manager 910 can teach, guide, tune, and/or train one or more neural networks. The training module 920 provides the decoder (network) 904, the gesture classifier 916, and the mode classifier 914 input-output pairs during training. Using supervised learning, the encoder 902, the decoder (network) 904, the gesture classifier 916, and the mode classifier 914 are trained. Specifically, the error determined from the decoder (network) 904, the gesture classifier 916, and the mode classifier 914 is passed backwards to the encoder 902 using the backpropagation algorithm.

The training module 920 is also configured to generate data for use in input-output pairs during training. For example, the training module 920 generates gesture input-output pairs used by the gesture classifier 916 to learn how to classify a received user input. Additionally, the training module 920 generates noisy masked objects in images to train the decoder 904 how to generate a mask using an initial mask.

As illustrated in FIG. 9, the segmentation system 900 also includes a neural network manager 912. Neural network manager 912 may host a plurality of neural networks or other machine learning models, such as multi layer perceptrons (e.g., mode classifier 914 and gesture classifier 916), encoders (e.g., encoder 902), and decoders (e.g., decoder (network) 904). The neural network manager 912 may include an execution environment, libraries, and/or any other data needed to execute the machine learning models. In some embodiments, the neural network manager 912 may be associated with dedicated software and/or hardware resources to execute the machine learning models. Although depicted in FIG. 9 as being hosted by a single neural network manager 912, in various embodiments the neural networks may be hosted in multiple neural network managers and/or as part of different components. For example, each classifier (e.g., mode classifier 914 and gesture classifier 916), encoder (e.g., encoder 902), and decoder (e.g., decoder (network) 904) can be hosted by their own neural network manager, or other host environment, in which the respective neural networks execute. In other embodiments, groups of machine learning models may be executed by their own neural network manager or other host environment. For example, both the classifiers may be hosted by a single "classifier" neural network manager. Additionally, or alternatively, each machine learning model (or groups of machine learning models) may be spread across multiple neural network managers depending on, e.g., the resource requirements, traffic, lag, etc.

As illustrated in FIG. 9, the segmentation system 900 also includes the storage manager 910. The storage manager 910 maintains data for the segmentation system 900. The storage manager 910 can maintain data of any type, size, or kind as necessary to perform the functions of the segmentation system 900. For example, the storage manager 910, as shown in FIG. 9, includes the training data 924. As described herein, training data 924 can include input-output pairs such generated gesture inputs and corresponding gesture labels, and generated initial masks and corresponding masked objects in images. The storage manager 910 also stores image datasets 922 including images of objects and corresponding masked objects. Additionally or alternatively, the storage manager 910 may store addresses (e.g., memory addresses, URL addresses, MAC addresses, IP addresses, port addresses, etc.) in which to query image dataset data from. In some implementations, the storage manager 910 stores initial masks 926. As described herein, masked objects are iteratively corrected. Each iteration, the initial mask used to generate the corrected mask is stored by the storage manager 910. In some embodiments, multiple initial masks are stored by the storage manager 910, where each of the initial masks represents a previously corrected masked object in the image.

Each of the components 902-920 of the segmentation system 900 and their corresponding elements (as shown in FIG. 9) may be in communication with one another using any suitable communication technologies. It will be recognized that although components 902-920 and their corresponding elements are shown to be separate in FIG. 9, any of components 902-920 and their corresponding elements may be combined into fewer components, such as into a single facility or module, divided into more components, or configured into different components as may serve a particular embodiment.

The components 902-920 and their corresponding elements can comprise software, hardware, or both. For example, the components 902-920 and their corresponding elements can comprise one or more instructions stored on a computer-readable storage medium and executable by processors of one or more computing devices. When executed by the one or more processors, the computer-executable instructions of the segmentation system 900 can cause a client device and/or a server device to perform the methods described herein. Alternatively, the components 902-920 and their corresponding elements can comprise hardware, such as a special purpose processing device to perform a certain function or group of functions. Additionally, the components 902-920 and their corresponding elements can comprise a combination of computer-executable instructions and hardware.

Furthermore, the components 902-920 of the segmentation system 900 may, for example, be implemented as one or more stand-alone applications, as one or more modules of an application, as one or more plug-ins, as one or more library functions or functions that may be called by other applications, and/or as a cloud-computing model. Thus, the components 902-920 of the segmentation system 900 may be implemented as a stand-alone application, such as a desktop or mobile application. Furthermore, the components 902-920 of the segmentation system 900 may be implemented as one or more web-based applications hosted on a remote server. Alternatively, or additionally, the components of the segmentation system 900 may be implemented in a suite of mobile device applications or "apps."

As shown, the segmentation system 900 can be implemented as a single system. In other embodiments, the segmentation system 900 can be implemented in whole, or in part, across multiple systems. For example, one or more functions of the segmentation system 900 can be performed by one or more servers, and one or more functions of the segmentation system 900 can be performed by one or more client devices. The one or more servers and/or one or more client devices may generate, store, receive, and transmit any type of data used by the segmentation system 900, as described herein.

In one implementation, the one or more client devices can include or implement at least a portion of the segmentation system 900. In other implementations, the one or more servers can include or implement at least a portion of the segmentation system 900. For instance, the segmentation system 900 can include an application running on the one or more servers or a portion of the segmentation system 900 can be downloaded from the one or more servers. Additionally or alternatively, the segmentation system 900 can include a web hosting application that allows the client device(s) to interact with content hosted at the one or more server(s).

For example, upon a client device accessing a web application hosted at the one or more servers, the one or more service provide access to the segmentation system 900. In some embodiments, the client device is used to upload one or more digital images. In other embodiments, the one or more servers can provide access to one or more digital images. As described herein, a user uses the client device to select an object of interest in the image. Upon receiving the gesture performed by the user to select the object of interest, the one or more servers automatically perform the methods and process described above to predict the user's intent and generate a mask over the object of interest. The one or more servers communicate the image including the masked object to the client device for display to the user. In some embodiments, the user uses the client device to select another object of interest in the image with the intention of adding/removing the selected object of interest from the received masked object. Upon receiving the gesture performed by the user to select the additional object of interest, the one or more servers automatically perform the methods and processes described above to predict the user's intent and generate a mask over the object of interest using the previously generated masked over the object of interest. In this manner, the one or more servers corrects the mask of the object of interest by adding (or removing) the additional object of interest to the mask. The one or more servers can iteratively communicate a corrected image including the masked object to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

FIGS. 1-9, the corresponding text, and the examples, provide a number of different systems and devices that allows a user's input to be interpreted, predicting a user intent to generate a mask. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of predicting a user's intent to generate a mask based on a user gesture, in accordance with one or more embodiments. In one or more embodiments, the method 1000 is performed in a digital medium environment that includes the segmentation system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a user interaction corresponding to a region in an image. The user interaction may be a haptic input, a mouse decompression, a mouse compression, or an entered key. The user interaction selects (or otherwise distinguishes) a region of an image such as an object in the image from other objects in the image. The selection of the object in the image can be interpreted from a click (or tap), stroke (e.g., drawing, including one line strokes and back and forth scribbles), lasso (including loose lassos around the object of interest and finely traced lassos), bounding box, and the like.

As illustrated in FIG. 10, the method 1000 includes an act 1004 of generating a feature map using a first machine learning model and the user interaction, wherein the feature map includes a feature corresponding to a mode type. The first machine learning model may be an encoder configured to determine feature(s) corresponding to the mode type. A mode is an intended operation of a user. For example, a user may add an object to a previously selected object (e.g., add a sub-object that was not originally captured in the object of interest). Accordingly, the mode type is an "add mode." The user may also subtract an object from a previously selected object (e.g., remove a sub-object that was originally captured but that is not part of the object). Accordingly, the mode type is a "remove mode" (or a "subtract mode"). The mode type is determined using a classifier such as a multilayer perceptron.

As illustrated in FIG. 10, the method 1000 includes an act 1006 of generating a mask of the region in the image using a second machine learning model, wherein the mask is generated responsive to the mode type. The predicted mode from operation 1004 is fed as an input to another machine learning module such as a decoder. The decoder generates a mask of the object of interest responsive to "add mode" or "subtract mode." As described herein, in "add mode" the decoder adds pixels to a mask of an object of interest. In contrast, in "remove mode" the decoder removes pixels from the mask of the object of interest. The mask is a probability of each pixel belonging to the object of interest. As a result of generating the mask, an object of the image is captured or otherwise distinguished from other objects of the image. For example, the mask may highlight the object in the image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
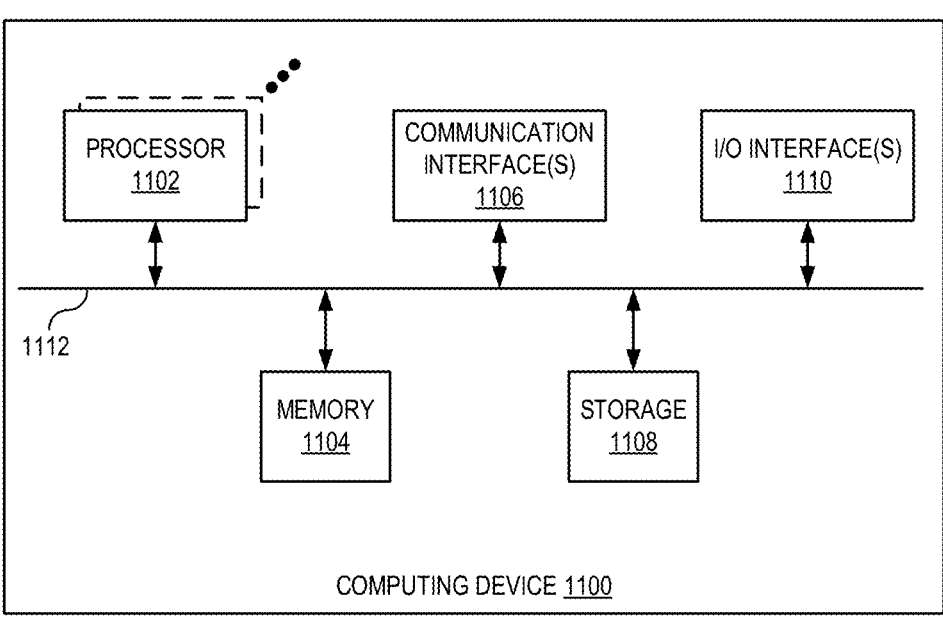
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the segmentation system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a user interaction corresponding to a region in an image;
   classifying the user interaction as a mode type from a set of predetermined mode types using a first classifier;
   classifying the user interaction as a gesture type from a set of predetermined gesture types using a second classifier, wherein the second classifier is a classifier different from the first classifier;
   generating a feature map using the user interaction, wherein the feature map includes a feature corresponding to the mode type determined by the first classifier and the gesture type determined by the second classifier; and
   generating a mask of the region in the image using a machine learning model, wherein the mask is generated responsive to the feature map.

2. The method of claim 1, wherein:
   generating the mask of the region in the image using the machine learning model further includes generating the mask of the region responsive to the gesture type.

3. The method of claim 1, further comprising:
   receiving an initial mask of the region in the image; and
   generating the mask of the region in the image using the machine learning model, wherein the mask is generated responsive to the mode type and the initial mask.

4. The method of claim 1, wherein the machine learning model is an ensemble of gesture-specific decoders including:
   an addition decoder configured to generate a first mask of the region in the image by adding pixels associated with the user interaction;
   a removal decoder configured to generate a second mask of the region in the image by removing pixels associated with the user interaction; and
   a mask selector configured to select the generated mask based on the first mask, the second mask, and the mode type.

5. The method of claim 1, wherein the machine learning model is an ensemble of mode-specific decoders including a gesture decoder corresponding to each gesture type from the set of predetermined gesture types.

6. The method of claim 5, wherein the set of predetermined of gesture types includes a click, a lasso, a bounding box, and a stroke.

7. The method of claim 1, wherein:

the mode type is an add mode, and wherein generating the mask of the region in the image includes adding one or more pixels corresponding to one or more pixels of the region.

8. The method of claim 1, wherein:

the mode type is a remove mode, and wherein generating the mask of the region in the image includes removing one or more pixels corresponding to one or more pixels of the region.

9. The method of claim 1, wherein the first classifier is a first head of a multitask model and the second classifier is a second head of the multitask model.

10. A system comprising:

a memory component; and a processing device coupled to the memory component, the processing device to perform operations comprising:

receiving a user interaction corresponding to a region in an image;

generating a feature vector using an encoder and the user interaction corresponding to the region in the image;

classifying the user interaction as a mode type from a set of predetermined mode types using a first classifier and the feature vector;

classifying the user interaction as a gesture type from a set of predetermined gesture types using a second classifier and the feature vector, wherein the second classifier is a classifier different from the first classifier;

generating, a mask of the region using a decoder, the feature vector, the mode type determined by the first classifier or the gesture type determined by the second classifier; and outputting a masked region based on the generated mask.

11. The system of claim 10, wherein the processing device performs further operations comprising:

generating the mask of the region using the decoder, the feature vector, the mode type, and the gesture type.

12. The system of claim 10, wherein the decoder includes at least one of:

an addition decoder configured to generate a first mask of the region in the image by adding pixels associated with the user interaction; or a removal decoder configured to generate a second mask of the region in the image by removing pixels associated with the user interaction.

13. The system of claim 12, wherein the processing device performs further operations comprising:

selecting the generated mask based on the first mask, the second mask, and a mode type.

14. The system of claim 10, wherein the decoder is a gesture decoder of a plurality of gesture decoders, wherein the plurality of gesture decoders each correspond to a different gesture type from the set of predetermined gesture types.

15. The system of claim 14, wherein the set of predetermined gesture types include a click, a lasso, a bounding box, and a stroke.

16. The system of claim 10, wherein:

the decoder is a gesture decoder of a plurality of gesture decoders, and the processing device performs further operations comprising:

triggering the gesture decoder corresponding to the gesture type.

17. A non-transitory computer-readable medium storing instructions that, when executed by a processor, cause the processor to:

receive a set of inputs including an image and at least one of a gesture map corresponding to a user interaction with a region in the image, or a distance map corresponding to a distance of the user interaction from the region in the image;

generate, based on the user interaction corresponding to the region in the image, a feature vector using an encoder based on the set of inputs;

classifying the user interaction as a mode type from a set of predetermined mode types using a first classifier;

classifying the user interaction as a gesture type from a set of predetermined gesture types using a second classifier wherein the second classifier is a second machine learning model that is different from the first machine learning model;

generate, using a decoder, a mask of the region, based on the feature vector, and at least one of the mode type or the gesture type; and output a masked region based on the generated mask.

18. The non-transitory computer-readable medium of claim 17, wherein the decoder is one decoder of a plurality of decoders, and the plurality of decoders include:

an addition decoder configured to generate a first mask of the region in the image by adding pixels associated with the user interaction; and a removal decoder configured to generate a second mask of the region in the image by removing pixels associated with the user interaction.

19. The non-transitory computer-readable medium of claim 18, storing instructions that further cause the processor to:

select the generated mask based on the first mask, the second mask, and the mode type.

20. The non-transitory computer-readable medium of claim 17, wherein the decoder is one decoder of a plurality of decoders, and the decoder of the plurality of decoders is triggered based on the gesture type, wherein the plurality of decoders includes a click decoder, a lasso decoder, a bounding box decoder, and a stroke decoder.

* * * * *